(12) United States Patent
Miyatani

(10) Patent No.: US 11,503,201 B2
(45) Date of Patent: Nov. 15, 2022

(54) FOCUS DETECTION DEVICE AND METHOD

(71) Applicant: SONY CORPORATION, Tokyo (JP)

(72) Inventor: Yoshitaka Miyatani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 86 days.

(21) Appl. No.: 16/753,715

(22) PCT Filed: Sep. 28, 2018

(86) PCT No.: PCT/JP2018/036189
§ 371 (c)(1),
(2) Date: Apr. 3, 2020

(87) PCT Pub. No.: WO2019/073814
PCT Pub. Date: Apr. 18, 2019

(65) Prior Publication Data
US 2020/0260014 A1    Aug. 13, 2020

(30) Foreign Application Priority Data
Oct. 13, 2017  (JP) .............................. JP2017-199088

(51) Int. Cl.
*H04N 5/232* (2006.01)
*G02B 7/34* (2021.01)
(Continued)

(52) U.S. Cl.
CPC ......... *H04N 5/232121* (2018.08); *G02B 7/34* (2013.01); *G06N 3/04* (2013.01); *G06N 3/08* (2013.01)

(58) Field of Classification Search
None
See application file for complete search history.

(56) References Cited

U.S. PATENT DOCUMENTS

2010/0013947 A1*  1/2010  Oikawa ................ G03B 13/36
                                                     348/222.1
2011/0205423 A1*  8/2011  Tsukada ................ G02B 7/38
                                                     348/345
(Continued)

FOREIGN PATENT DOCUMENTS

CN    102422630 A    4/2012
CN    107533753 A    1/2018
(Continued)

OTHER PUBLICATIONS

International Search Report and Written Opinion of PCT Application No. PCT/JP2018/036189, dated Dec. 25, 2018, 09 pages of ISRWO.

(Continued)

*Primary Examiner* — Cynthia Segura
(74) *Attorney, Agent, or Firm* — Chip Law Group

(57) ABSTRACT

The present technology relates to a focus detection device and method and a program by which an accurate image shift amount can be detected. A calculation unit performs calculation based on learning on the basis of a received light amount distribution of an A pixel group having a first property for phase difference detection and a received light amount distribution of a B pixel group having a second property different from the first property and outputs defocus amount related information relating to a defocus amount. The present technology can be applied to an imaging apparatus that performs focus detection by a phase difference detection method.

15 Claims, 26 Drawing Sheets

(51) Int. Cl.
*G06N 3/04* (2006.01)
*G06N 3/08* (2006.01)

(56) References Cited

U.S. PATENT DOCUMENTS

| | | | |
|---|---|---|---|
| 2012/0007997 A1 | 1/2012 | Oikawa | |
| 2013/0120643 A1* | 5/2013 | Tamaki | H04N 5/36961 |
| | | | 348/349 |
| 2013/0250149 A1* | 9/2013 | Yamasaki | G02B 7/34 |
| | | | 348/241 |
| 2013/0265483 A1* | 10/2013 | Tamaki | H04N 9/04557 |
| | | | 348/349 |
| 2015/0302589 A1* | 10/2015 | Sasaki | G06T 7/571 |
| | | | 382/106 |
| 2016/0044268 A1 | 2/2016 | Oikawa | |
| 2016/0248967 A1* | 8/2016 | Sasaki | H04N 5/232122 |
| 2017/0004624 A1 | 1/2017 | Hsu et al. | |
| 2017/0094153 A1 | 3/2017 | Wang et al. | |
| 2017/0352143 A1* | 12/2017 | Kompalli | G06K 9/6267 |
| 2017/0353648 A1* | 12/2017 | Katagawa | H04N 5/232122 |
| 2018/0150949 A1 | 5/2018 | Matono et al. | |
| 2018/0232898 A1 | 8/2018 | Hsu et al. | |
| 2021/0105423 A1* | 4/2021 | Miyakoshi | H04N 5/36963 |

FOREIGN PATENT DOCUMENTS

| | | |
|---|---|---|
| EP | 2430827 A1 | 3/2012 |
| EP | 3110135 A1 | 12/2016 |
| EP | 3287985 A1 | 2/2018 |
| JP | 2010-268052 A | 11/2010 |
| JP | 2014-056002 A | 3/2014 |
| JP | 2015-087705 A | 5/2015 |
| JP | 2016-197231 A | 11/2016 |
| JP | 2016-207030 A | 12/2016 |
| JP | 2017-116723 A | 6/2017 |
| RU | 2011150281 A | 6/2013 |
| RU | 2014119389 A | 9/2015 |
| WO | 2010/131561 A1 | 11/2010 |
| WO | 2016/171050 A1 | 10/2016 |

OTHER PUBLICATIONS

Office Action for JP Patent Application No. 2019-548117, dated Aug. 16, 2022, 03 pages of English Translation and 03 pages of Office Action.

* cited by examiner

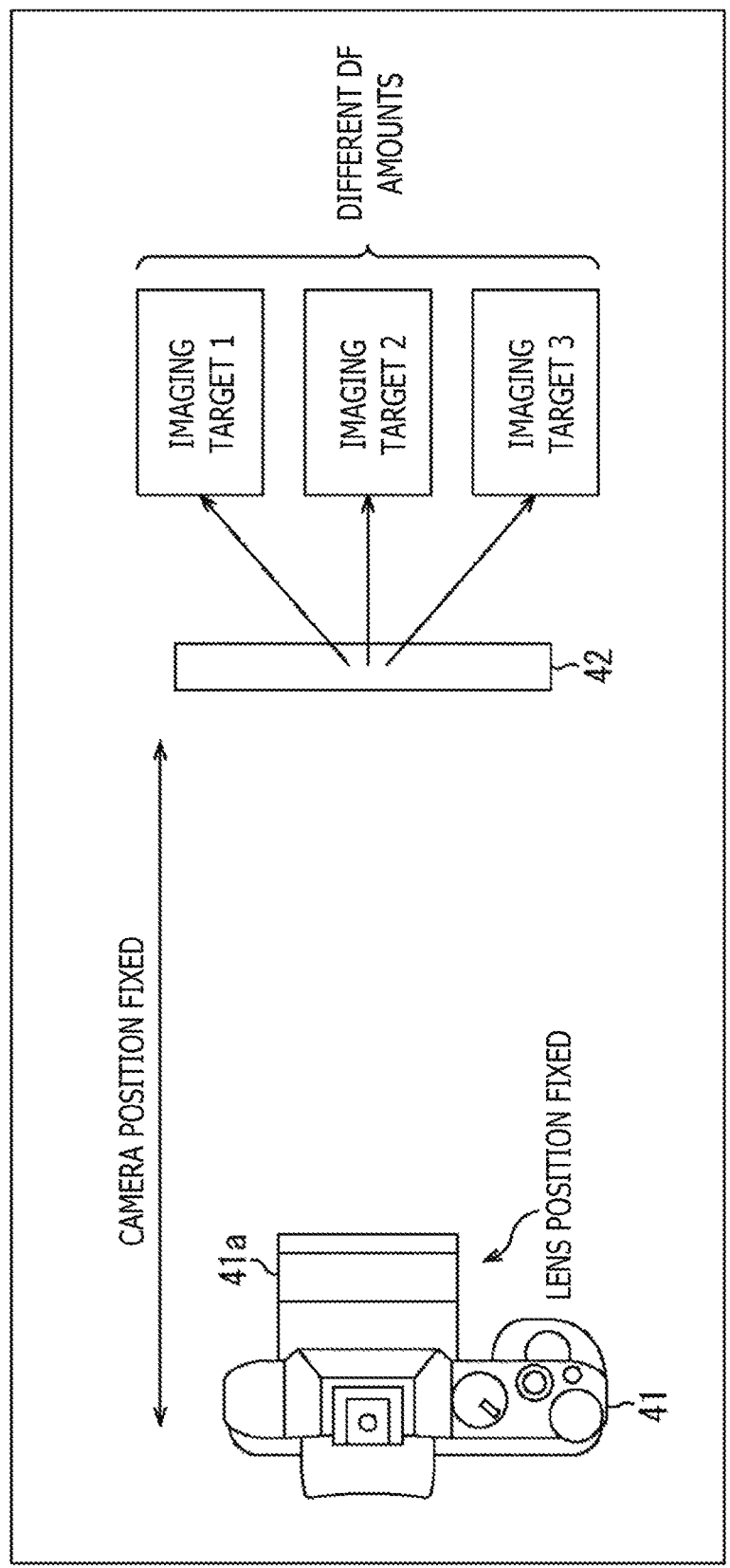

FOCUS DETECTION DEVICE AND METHOD

CROSS REFERENCE TO RELATED APPLICATIONS

This application is a U.S. National Phase of International Patent Application No. PCT/JP2018/036189 filed on Sep. 28, 2018, which claims priority benefit of Japanese Patent Application No. JP 2017-199088 filed in the Japan Patent Office on Oct. 13, 2017. Each of the above-referenced applications is hereby incorporated herein by reference in its entirety.

TECHNICAL FIELD

The present technology relates to a focus detection device and method and a program, and particularly to a focus detection device and program and a program by which an accurate image shift amount can be detected.

BACKGROUND ART

A pupil splitting phase difference detection method is known which performs focus detection using output signals of a pair of phase difference detecting pixels (hereinafter referred to as phase difference pixels) for performing pupil splitting of an imaging lens. In the pupil splitting phase difference detection method, an image shift amount of output signals of a pair of phase difference pixels is detected by performing center-of-gravity calculation, and the detected image shift amount is converted into a defocus value using a conversion coefficient. In order to calculate the conversion coefficient for the detected image shift amount, a technology is proposed which calculates the conversion coefficient using aperture information of the imaging lens and sensitivity information of the light receiving angles of the phase difference pixels.

Meanwhile, as a method for detecting an image shift amount, a correlation calculation method is known which shifts output signals of a pair of phase difference pixels and determines the shift amount at which the correlation of the waveforms indicates a maximum value as an image shift amount.

However, since waveforms of phase difference pixels (hereinafter referred to as phase difference waveforms) in the pupil splitting phase difference detection method described above have a characteristic that they do not coincide with each other in principle, it is difficult to provide a conversion coefficient appropriate for an image shift amount detected by center-of-gravity calculation.

Therefore, a technology has been proposed in which an image shift amount calculated by the correlation calculation method is provided as a correction value to an image shift amount detected by center-of-gravity calculation (refer to PTL

CITATION LIST

Patent Literature

[PTL 1]
JP 2014-56002A

SUMMARY

Technical Problems

However, the proposal of PTL 1 allows only adjustment to an average value over an overall imaging target for which evaluation is performed. Further, a countermeasure is required against a change of a result of the correlation calculation in response to an imaging target shape caused by a mismatch between phase difference waveforms.

The present technology has been made in view of such a situation as described above and makes it possible to detect an accurate image displacement amount.

Solution to Problems

A focus detection device of one aspect of the present technology includes a calculation unit configured to output defocus amount related information relating to a defocus amount on the basis of a received light amount distribution of a first pixel group having a first property for phase difference detection and a received light amount distribution of a second pixel group having a second property different from the first property.

In the one aspect of the present technology, defocus amount related information relating to a defocus amount is outputted on the basis of a received light amount distribution of a first pixel group having a first property for phase difference detection and a received light amount distribution of a second pixel group having a second property different from the first property.

Advantageous Effect of Invention

According to the present technology, an accurate image shift amount can be detected.

It is to be noted that the advantageous effect described here is not always restrictive and may be some effect described in the present disclosure.

BRIEF DESCRIPTION OF DRAWINGS

FIG. 4 is a view illustrating a relationship between a picture and a defocus amount.

DESCRIPTION OF EMBODIMENTS

In the following, a mode for carrying out the present technology is described. The description is given in the following order.

0. Overview
1. Imaging Apparatus
2. Application Example

0. Overview

A phase difference detection method is known which performs focus detection using output signals of a pair of phase difference detecting pixels (hereinafter referred to as phase difference pixels) for performing pupil splitting of an imaging lens. In the pupil splitting phase difference detection method, an image shift amount of output signals of a pair of phase difference pixels is detected by performing center-of-gravity calculation or correlation calculation, and a process for converting the detected image shift amount into a defocus amount using a predetermined conversion coefficient is performed.

<Example of Photosensitivity Distribution of Phase Difference Pixels>

Figure 1A:
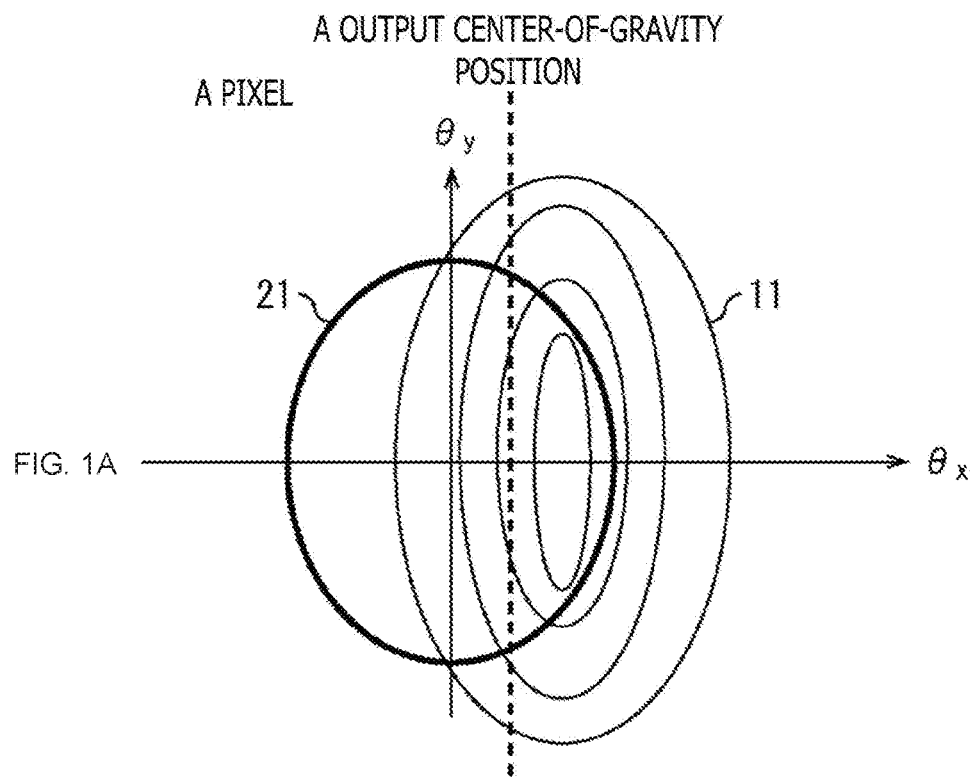
FIGS. 1A and 1B are views depicting a photosensitivity distribution of phase difference pixels and a pupil of an imaging lens.
Figure 1B:
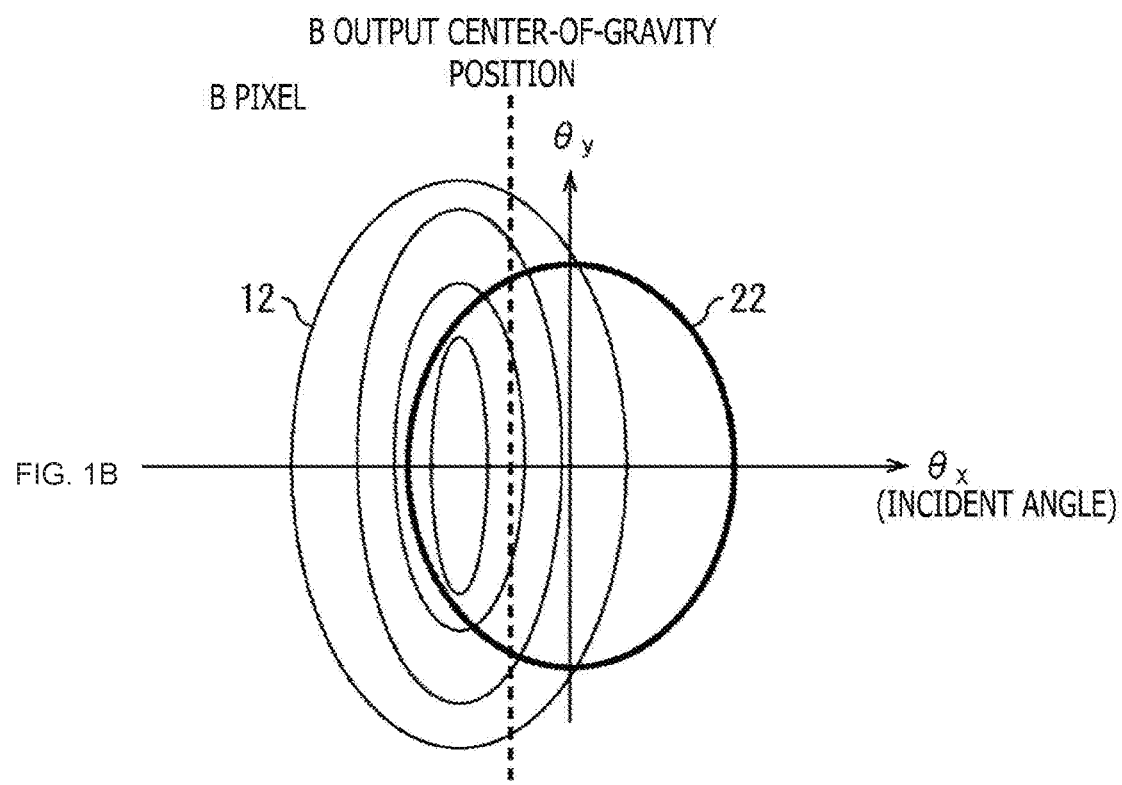

FIGS. 1A and 1B are views depicting a photosensitivity distribution of phase difference pixels and a pupil of an imaging lens.

Referring to FIGS. 1A and 1B, a photosensitivity distribution of each of an A pixel and a B pixel that are phase difference pixels is depicted. The axis of ordinate of FIGS. 1A and 1B represents an incident angle $\theta y$ in the y axis direction, and the axis of abscissa represents an incident angle $\theta x$ in the x axis direction. The origin corresponds to the position of the optical axis.

A plurality of concentric ellipses of FIGS. 1A and 1B indicates a photosensitivity distribution, and a circle nearer to the center represents a higher photosensitivity. A broken line in FIGS. 1A and 1B indicates an output center-of-gravity position of each of the A pixel and the B pixel.

FIG. 1A is a view depicting a photosensitivity distribution 11 of the A pixel and a pupil 21 of an imaging lens. The A pixel is a pixel that is shaded at a left portion thereof and performs light reception at a right side portion thereof. Accordingly, the photosensitivity distribution 11 of the A pixel is displaced to the right side. Light reception is performed over a range overlapping with the pupil 21 from within the range of the photosensitivity distribution 11 of the A pixel, and such a received light amount as indicated by FIG. 2A is detected.

FIG. 1B is a view depicting a photosensitivity distribution 12 of the B pixel and a pupil 22 of the imaging lens. The B pixel is a pixel that is shaded at a right portion thereof and performs light reception at a left side portion thereof. Accordingly, the photosensitivity distribution 12 of the B pixel is displaced to the left side. Light reception is performed over a range overlapping with the pupil 22 from within the range of the photosensitivity distribution 12 of the B pixel, and such a received light amount as indicated by FIG. 2B is detected.

<Example of Received Light Amount Distribution of Phase Difference Pixels>

Figure 2A:
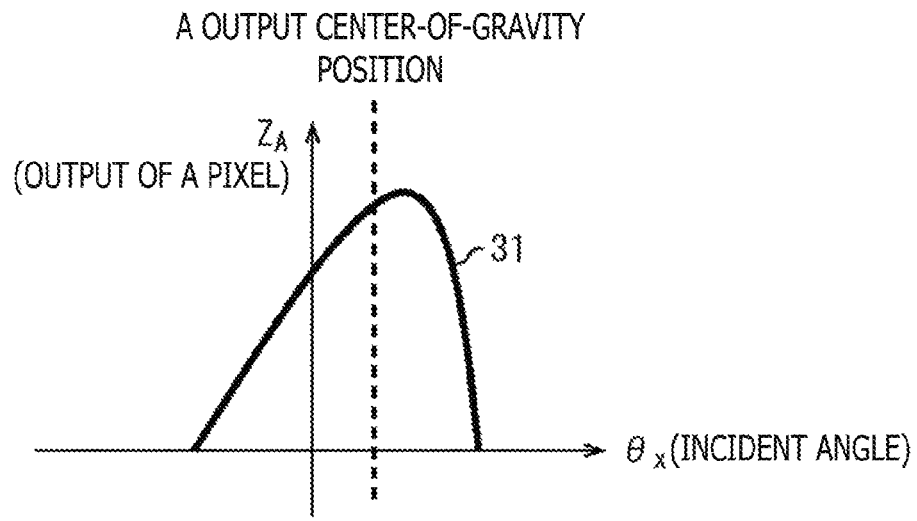
FIGS. 2A and 2B are views depicting an example of a received light amount distribution of the phase difference pixels.
Figure 2B:
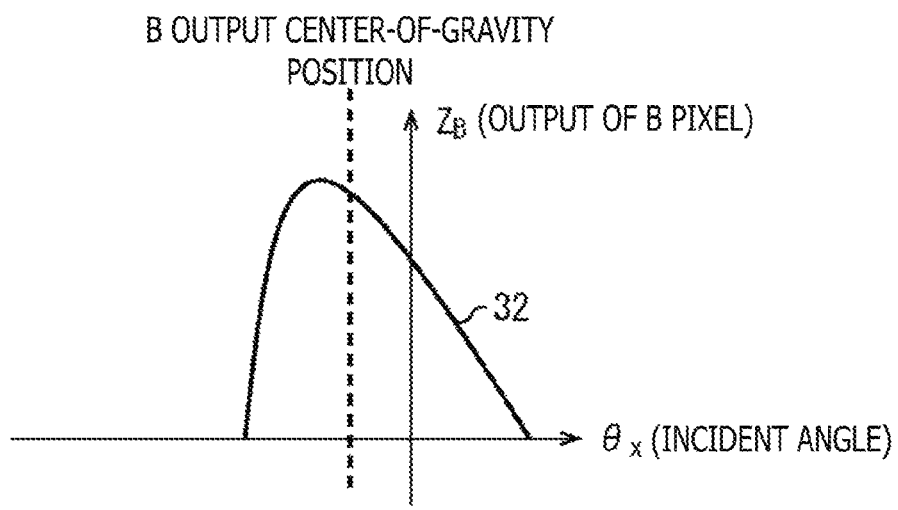

FIGS. 2A and 2B are views depicting an example of received light amount distributions of the phase difference pixels of FIGS. 1A and 1B.

The axis of ordinate in FIGS. 2A and 2B indicates output signal levels ZA and ZB according to received light amounts of the phase difference pixels, and the axis of abscissa indicates the incident angle $\theta x$ in the x axis direction. The output signal level ZA is an output signal level of the A pixel, and the output signal level ZB is an output signal level of the B pixel. Also broken lines in FIGS. 2A and 2B indicate output center-of-gravity positions of the A pixel and the B pixel.

FIG. 2A indicates an example of a received light amount distribution 31 of the A pixel. Since, in addition to that the photosensitivity distribution 11 of the A pixel is displaced to the right side as depicted with reference to FIG. 1A, light reception is performed only over a range overlapping with the pupil 21, the received light amount distribution 31 of the A pixel has such a waveform as indicated by FIG. 2A.

FIG. 2B indicates an example of a received light amount distribution 32 of the B pixel. Since, in addition to that the photosensitivity distribution 12 of the B pixel is displaced to the left side as depicted with reference to FIG. 1B, light reception is performed only over a range overlapping with the pupil 22, the received light amount distribution 32 of the B pixel has such a waveform as indicated by FIG. 2B.

Since the light reception property of the A pixel and the light reception property of the B pixel are different from each other in such a manner, the received light amount distribution 31 of the A pixel and the received light amount distribution 32 of the B pixel do not coincide with each other in principle.

<How to Obtain Phase Difference>

Figure 3A:
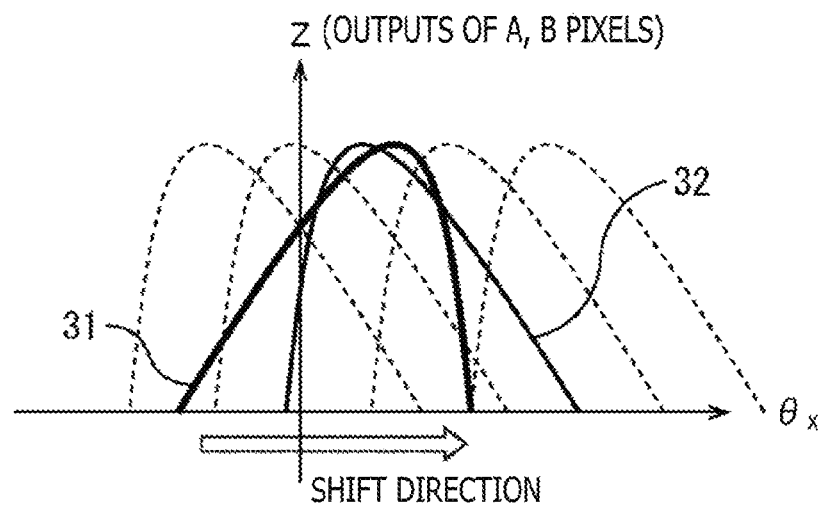
FIGS. 3A and 3B are views illustrating a method for obtaining a phase difference.
Figure 3B:
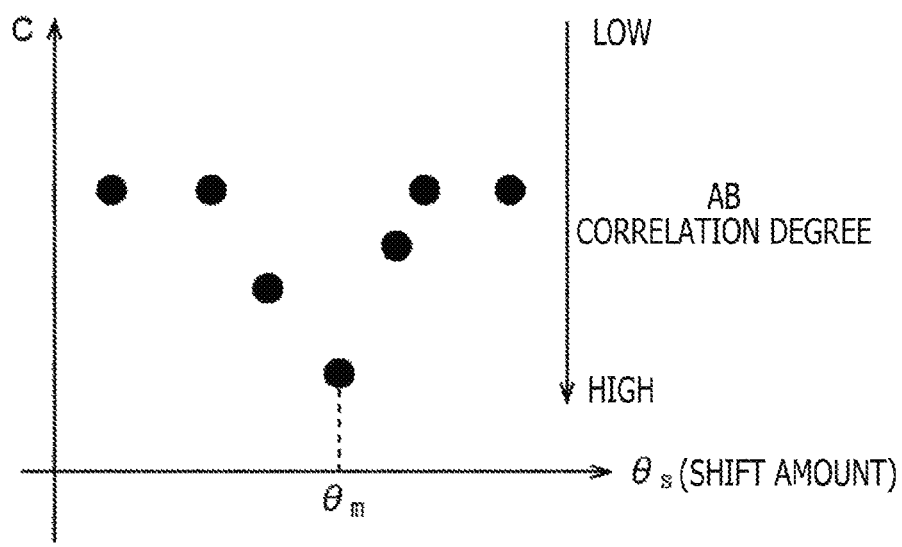

FIGS. 3A and 3B are views illustrating a method for obtaining a phase difference.

In FIG. 3A, the axis of ordinate indicates an output level Z according the received light amount of the A pixel or the B pixel, and the axis of abscissa indicates the incident angle θx in the x axis direction.

If the received light amount distribution 32 of the B pixel is successively shifted in the +θx direction as indicated by a white arrow mark in FIG. 3A while the received light amount distribution 31 of the A pixel is fixed, then the correlation of the received light amount distributions of the A pixel and the B pixel becomes highest at a certain shift amount θm as depicted in FIG. 3B. FIG. 3B depicts a relationship between a correlation calculation result C and a shift amount θs, and a dot indicated at a lower position indicates that the correlation of the received light amount distributions of the A pixel and the B pixel is higher.

Calculation using a conversion coefficient is performed on the basis of the image offset amount when the correlation is the highest shift amount θm to obtain a defocus amount.

However, in the pupil splitting phase difference detection method, the phase difference waveforms representative of received light amount distributions of the A pixel and the B pixel do not coincide with each other in principle as described hereinabove.

Accordingly, in the pupil splitting phase difference detection method in which it is prerequisite that the phase difference waveforms coincide with each other, it has been difficult to provide an appropriate conversion coefficient to an image offset amount detected by center-of-gravity calculation or correlation calculation.

Further, even if the positions of a camera 41 and a lens 41a were fixed and the position of an imaging target 42 was fixed as depicted in FIG. 4, in the case where the picture of the imaging target differed, different defocus amounts were calculated. An imaging target 1, another imaging target 2, and a further imaging target 3 are imaging targets having pictures different from one another.

<Relationship Between Picture and Correlation Calculation Result>

Figure 5:
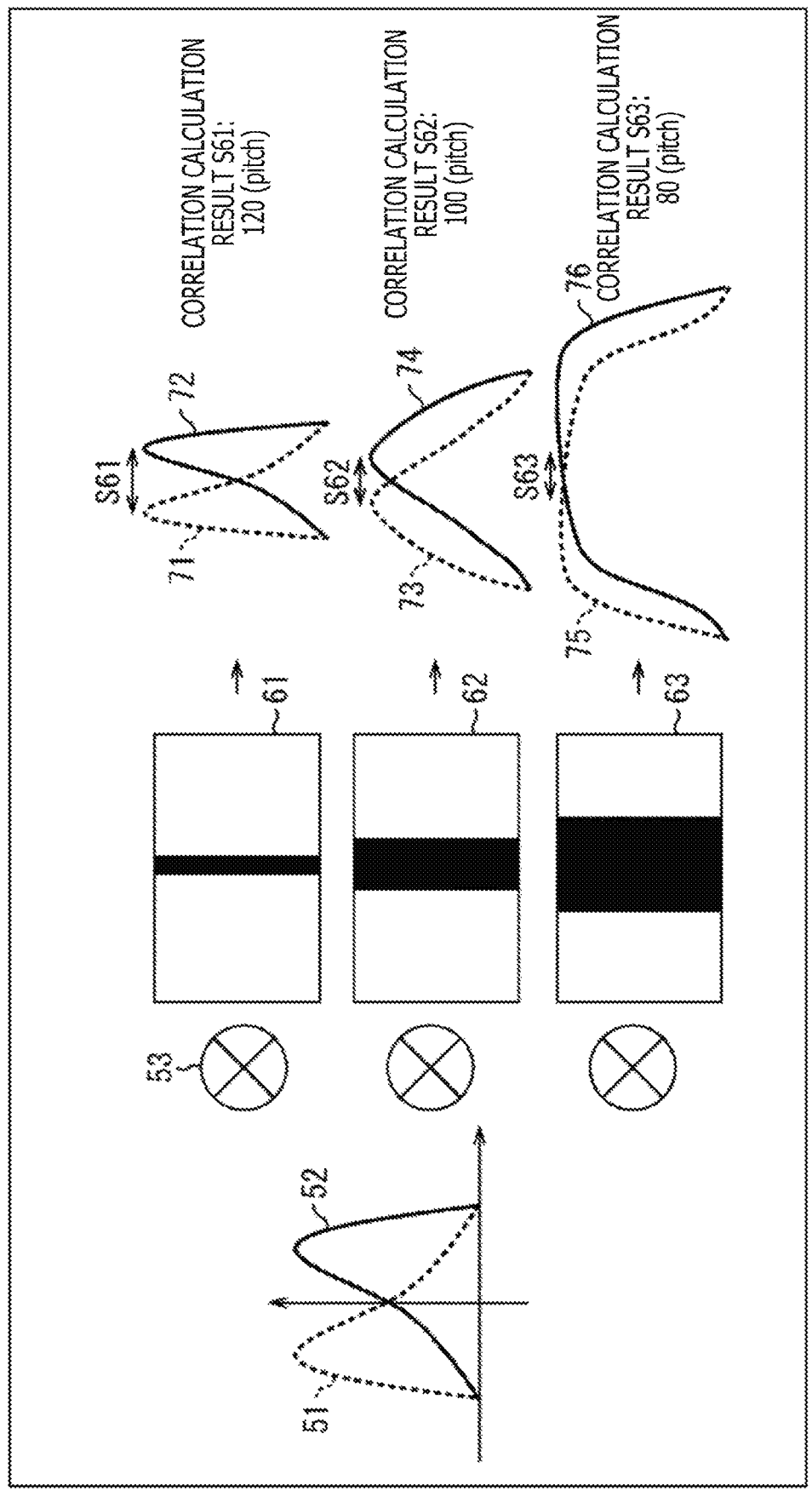
FIG. 5 is a view illustrating a relationship between a picture and a correlation calculation result.

FIG. 5 is a view illustrating a relationship between a picture and a correlation calculation result.

On the left side in FIG. 5, an LSF (Line Spread Function) 51 of the A pixel and an LSF 52 of the B pixel are depicted. The LSF is a blurring function.

According to a simulation, if the lens position, the camera position, and the imaging target position are same, then the LSF is same. Although the present embodiment uses the LSF as a blurring function, some other blurring function such as a PSF (Point Spread Function) may be used. Actually, normalization is performed such that the area defined by the LSF and the axis of abscissa becomes 1.

The output of the A pixel and the output of the B pixel are represented as convolutions (convolutions) 53 of the respective LSFs and the imaging target images. In an imaging target image 61 to an imaging target image 63 of FIG. 5, that the slit width differs among them represents that the images are of pictures different from each other.

In the example of FIG. 5, a correlation calculation result S61 of a phase difference waveform 71 of the A pixel and a phase difference waveform 72 of the B pixel after the imaging target image 61 is convoluted is 120 pitches. Meanwhile, a correlation calculation result S62 of a phase difference waveform 73 of the A pixel and a phase difference waveform 74 of the B pixel after the imaging target image 62 is convoluted is 100 pitches. A correlation calculation result S63 of a phase difference waveform 75 of the A pixel and a phase difference waveform 76 of the B pixel after the imaging target image 63 is convoluted is 80 pitches.

As described above, the phase difference waveforms after convolution differ depending upon the relationship between the LSF and the slit width (picture difference), and also the correlation calculation result S61 to the correlation calculation result S63 differ. In other words, the correlation calculation fails to accurately calculate the picture distance.

This arises from a cause that it is a mistake in the first place to apply correlation calculation to phase difference waveforms that do not coincide with each other in principle and a correlation calculation result does not have any physical meaning.

<Information Required for Calculation of Defocus Amount>

Figure 6:
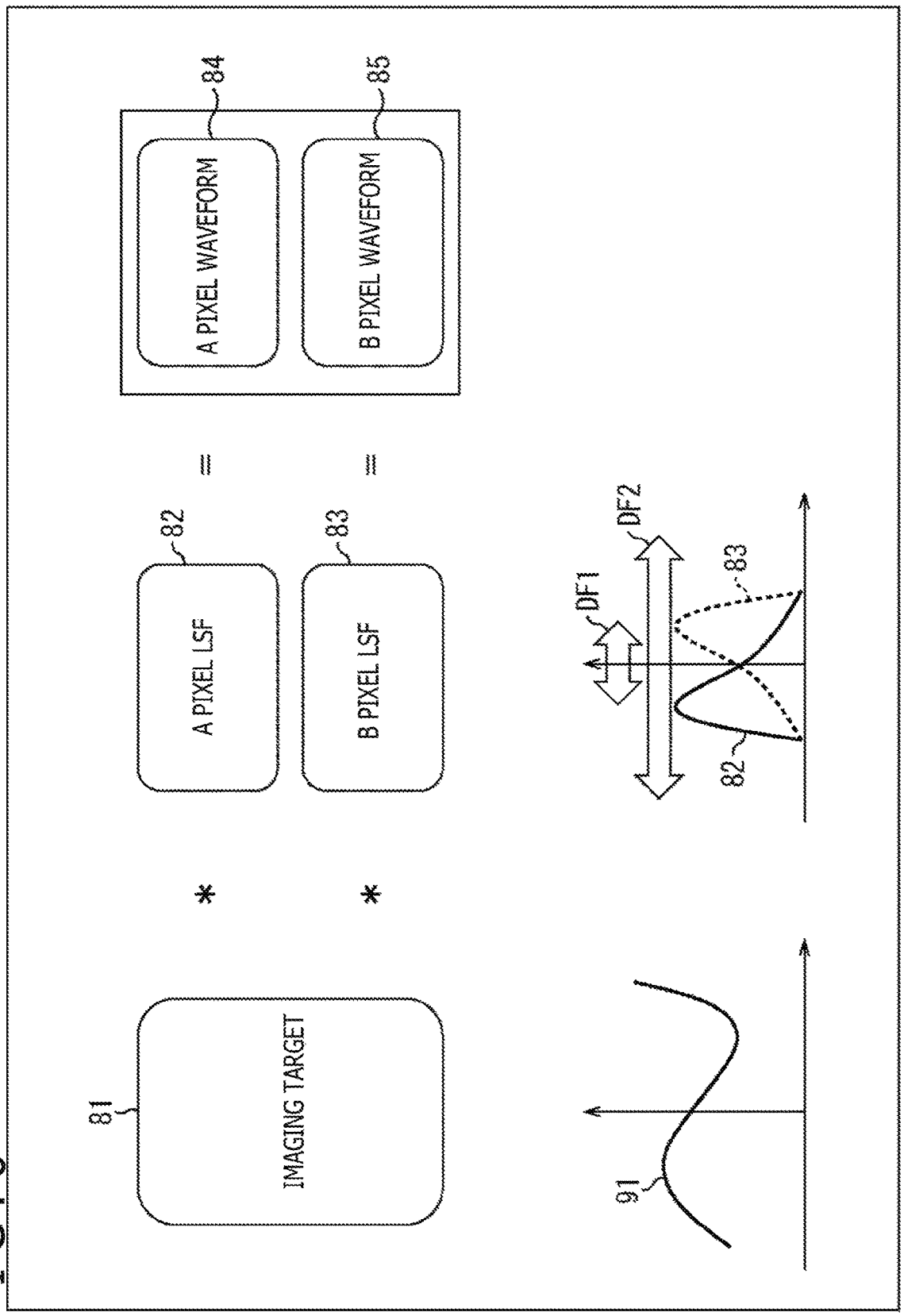
FIG. 6 is a view illustrating information necessary for calculation of a defocus amount.

FIG. 6 is a view illustrating information required for calculation of a defocus amount.

At the upper stage in FIG. 6, an imaging target image 81, operators representative of convolution (convolution calculation), an LSF 82 of the A pixel and an LSF 83 of the B pixel, and a phase difference waveform 84 of the A pixel and a phase difference waveform 85 of the B pixel are depicted in order from the left.

Under the imaging target image 81, a waveform 91 representative of the imaging target image 81 is depicted. Under the LSF 82 of the A pixel and the LSF 83 of the B pixel, the LSF 82 of the A pixel and the LSF 83 of the B pixel are depicted as waveforms. White arrow marks depicted above the LSF 82 of the A pixel and the LSF 83 of the B pixel indicate a defocus amount DF1 and another defocus amount DF2 that are different between pictures of the imaging target image 81.

In conventional correlation calculation for phase difference detection, only the phase difference waveform 84 of the A pixel and the phase difference waveform 85 of the B pixel that can be observed are used as depicted in FIG. 6. The phase difference waveform 84 of the A pixel and the phase difference waveform 85 of the B pixel are calculated by convolution of the LSF 82 of the A pixel and the LSF 83 of the B pixel into the imaging target image 81.

Information that is obtained actually includes, in addition to the phase difference waveform 84 of the A pixel and the phase difference waveform 85 of the B pixel, information that, as first information that has not been used in conventional correlation calculation, the imaging target of the phase difference waveform 84 of the A pixel and the imaging target of the phase difference waveform 85 of the B pixel are a common imaging target.

Further, as second information that has not been used in conventional correlation calculation, there is information that the LSF 82 of the A pixel and the LSF 83 of the B pixel have a mirror image relationship with respect to the axis of ordinate and they are only elongated in accordance with a defocus amount.

Here, information of a defocus amount is originally possessed by the LSF 82 of the A pixel and the LSF 83 of the B pixel, and the phase difference waveform 84 of the A pixel and the phase difference waveform 85 of the B pixel obtained are only those after the LSFs are convoluted. In other words, from the phase difference waveform 84 of the A pixel and the phase difference waveform 85 of the B pixel, it cannot be known what LSF is convoluted.

What is to be extracted in phase difference detection is not a phase difference but is an LSF itself.

Therefore, the present technology inputs a pair of phase difference waveforms to a neural network such that defocus related information that is related to a defocus amount such as a blurring function or an image shift amount is outputted from the neural network.

The neural network is created by mechanical learning hereinafter described using an imaging target, LSFs, waveforms or the like as learning data.

Although mechanical learning in the present embodiment is described taking a neural network as an example, deep learning or calculation by other mechanical learning may be used. As the other mechanical learning, random forest and K-means are available.

Further, in place of a neural network, calculation not by mechanical learning but by statistical learning such as classification adaptive processing may be used.

Although conventional correlation calculation uses only the phase difference waveform 84 of the A pixel and the phase difference waveform 85 of the B pixel that are information after convoluted, by using a neural network, it is possible to include the first information and the second information, which have not been used, as constrains to obtain an image offset amount.

In other words, also in the case where phase difference waveforms that originally do not coincide with each other are used, an accurate image offset amount can be obtained. By obtaining an accurate image offset amount, it becomes possible to obtain an accurate defocus amount, and as a result, the accuracy of focus control that is performed on the basis of the defocus amount can be improved.

1. Imaging Apparatus

First, a phase difference processing unit included in an imaging apparatus to which the present technology is applied.

<Example of Configuration of Phase Difference Processing Unit>

Figure 7:
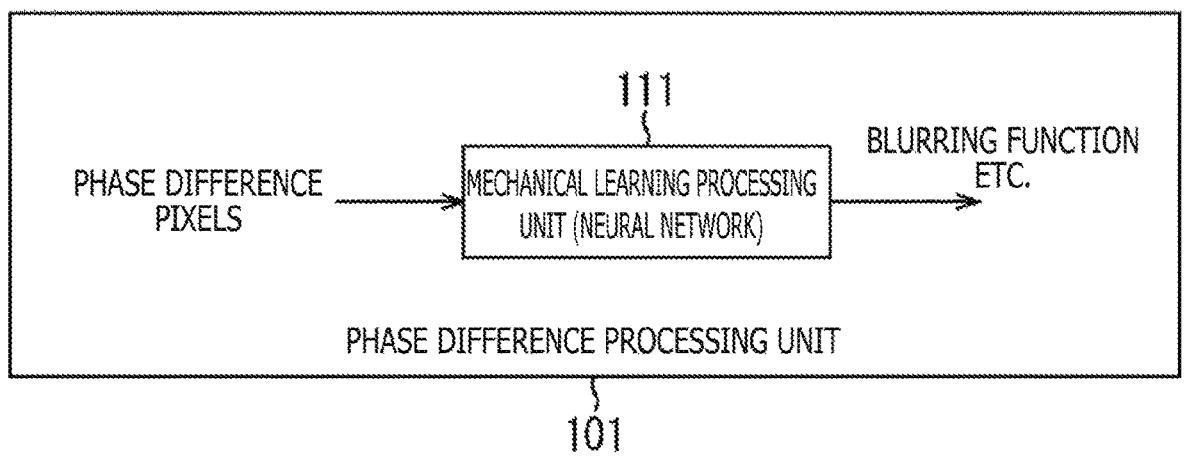
FIG. 7 is a block diagram depicting a first example of a configuration of a phase difference processing unit to which the present technology is applied.

FIG. 7 is a block diagram depicting a first example of a configuration of the phase difference processing unit to which the present technology is applied.

The phase difference processing unit 101 of FIG. 7 performs a phase difference detection process on the basis of signals of phase difference pixels. A received light amount distribution of the phase difference pixels is represented by the signals of the phase difference pixels.

As depicted in FIG. 7, the phase difference processing unit 101 includes a mechanical learning processing unit 111. The mechanical learning processing unit 111 is a neural network created by mechanical learning hereinafter described.

The mechanical learning processing unit 111 outputs defocus amount related information on the basis of signals of phase difference pixels. In particular, the mechanical learning processing unit 111 accepts signals of phase difference pixels as inputs thereto to perform a mechanical learning process and outputs defocus mounted related information such as a blurring function or an image shift amount.

It is to be noted that, in the present embodiment, the mechanical learning signifies a learning process for creating a neural network. Further, the mechanical learning process signifies a guess (inference) process using a neural network.

A defocus amount necessary for an autofocus function or a focus assist function is calculated on the basis of defocus amount related information outputted from the mechanical learning processing unit 111.

Figure 8:
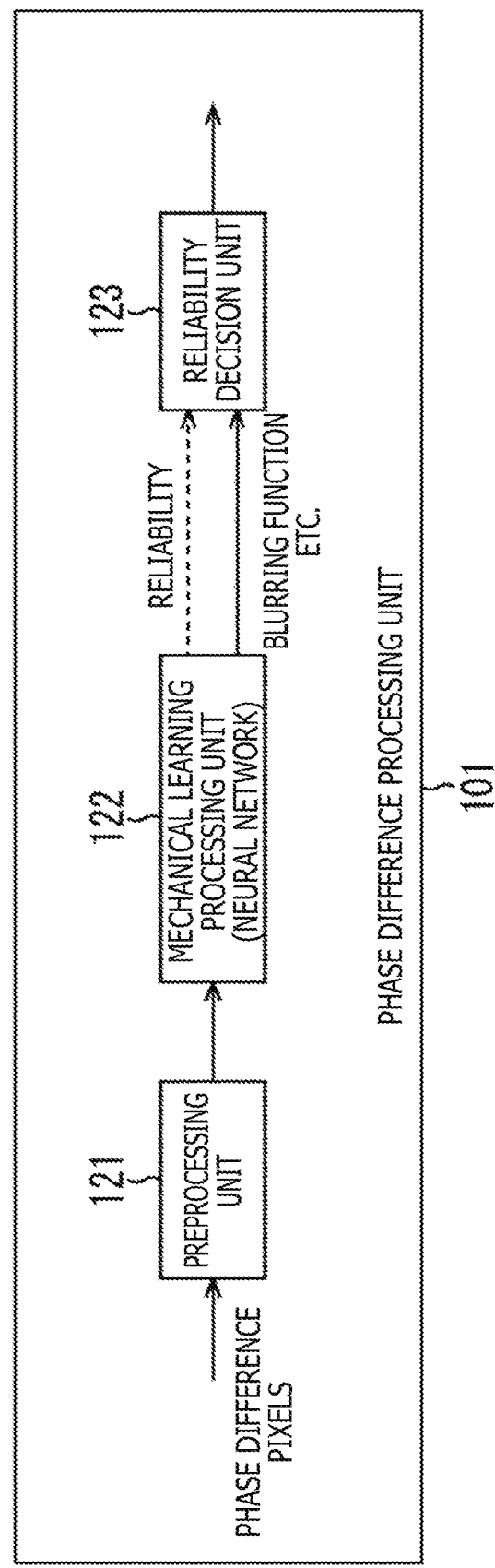
FIG. 8 is a block diagram depicting a second example of a configuration of the phase difference processing unit to which the present technology is applied.

FIG. 8 is a block diagram depicting a second example of a configuration of the phase difference processing unit to which the present technology is applied.

The phase difference processing unit 101 of FIG. 8 is configured such that it includes a preprocessing unit 121, a mechanical learning processing unit 122, and a reliability decision unit 123.

The preprocessing unit 121 carries out preprocessing for signals of the A pixel and the B pixel that are phase difference pixels and outputs signals of the phase difference pixels after the preprocessing to the mechanical learning processing unit 122.

In the preprocessing unit 121, as the preprocess, any of the following first to fifth processes is executed. In each expression, "A" represents a pixel value of the A pixel, and "B" represents a pixel value of the B pixel.

The first process is a process of normalizing the pixel value of the A pixel and the pixel value of the B pixel on the basis of a higher one from between a maximum value of the pixels of the A pixel group and a maximum value of the pixels of the B pixel group. The normalized pixel value of the A pixel and the normalized pixel value of the B pixel by the first process are inputted to the mechanical learning processing unit 122. The first process is represented by the following expressions (1).

[Math. 1]

$A = A/\max(\max(A),\max(B))$ $B = B/\max(\max(A),\max(B))$ (1)

The second process is a process of normalizing, for an A pixel, the pixel value of the A pixel on the basis of a maximum value of the pixels of the A pixel group and normalizing, for a B pixel, the pixel value of the B pixel on the basis of a maximum value of the pixels of the B pixel group. The normalized pixel value of the A pixel and the normalized pixel value of the B pixel by the second process are inputted to the mechanical learning processing unit 122. The second process is represented by the following expression (2).

[Math. 2]

$A = A/\max(A)$ $B = B/\max(B)$ (2)

The third process is a process for dividing, for an A pixel, a value obtained by subtracting an average value of the pixels of the A pixel group from the pixel value of the A pixel by a variance of the pixels of the A pixel group and dividing, for a B pixel, a value obtained by subtracting an average value of the pixels of the B pixel group from the pixel value of a B pixel by a variance of the pixels of the B pixel group. By the third process, a value obtained by division by the variance of the pixels of the A pixel group and a value obtained by division by the variance of the pixels of the B pixel group are inputted to the mechanical learning processing unit 122. The third process is represented by the following expression (3).

[Math. 3]

$A = (A - \mathrm{mean}(A))/\mathrm{var}(A)$ $B = (B - \mathrm{mean}(B))/\mathrm{var}(B)$ (3)

The fourth process is a process of adding pixel values of a pixel group including n pixels. More particularly, the fourth process is a process of adding the pixel values of a pixel group including n A pixels and adding the pixel values of another pixel group including n B pixels. By the fourth process, a value obtained by adding the pixel values of the pixel group including n A pixels and a value obtained by adding the pixel values of the pixel group including n B pixels are inputted to the mechanical learning processing unit 122.

The fifth process is a process of thinning out a pixel for each pixel group including n pixels. More particularly, the fifth process is a process of thinning out a pixel for each pixel group including n A pixels and thinning out a pixel for each pixel group including n B pixels. By the fifth process, a pixel value of a pixel group of A pixels where a pixel is thinned out for each pixel group including n A pixels and a pixel value of a pixel group of B pixels where a pixel is thinned out for each pixel group including n B pixels are inputted to the mechanical learning processing unit 122.

By performing such preprocesses as described above, the efficiency of the mechanical learning of the mechanical learning processing unit 122 that is a neural network can be improved. Further, by performing such a normalization process as the first process and the second process or such a standardization process as the third process, the generalization ability of the mechanical learning processing unit 122 that is a neural network can be enhanced.

It is to be noted that the preprocess is not limited to the first to fifth processes described above and may be some other calculation process, or the A pixel and the B pixel may be passed as they are. Also the phase difference processing unit 101 of FIG. 7 may include the preprocessing unit 121.

The mechanical learning processing unit 122 performs a mechanical learning process using signals of phase difference pixels as inputs thereto and outputs reliability information representative of reliability of defocus amount related information in addition to an output of defocus amount related information.

The reliability decision unit 123 decides, on the basis of defocus amount related information and reliability information, the height of the reliability of the defocus amount related information relating to the defocus amount. The reliability decision unit 123 outputs only the defocus amount related information decided to have high reliability to the succeeding stage. The defocus amount related information that is decided to have low reliability is removed.

<Example of Configuration of Imaging Apparatus>

Figure 9:
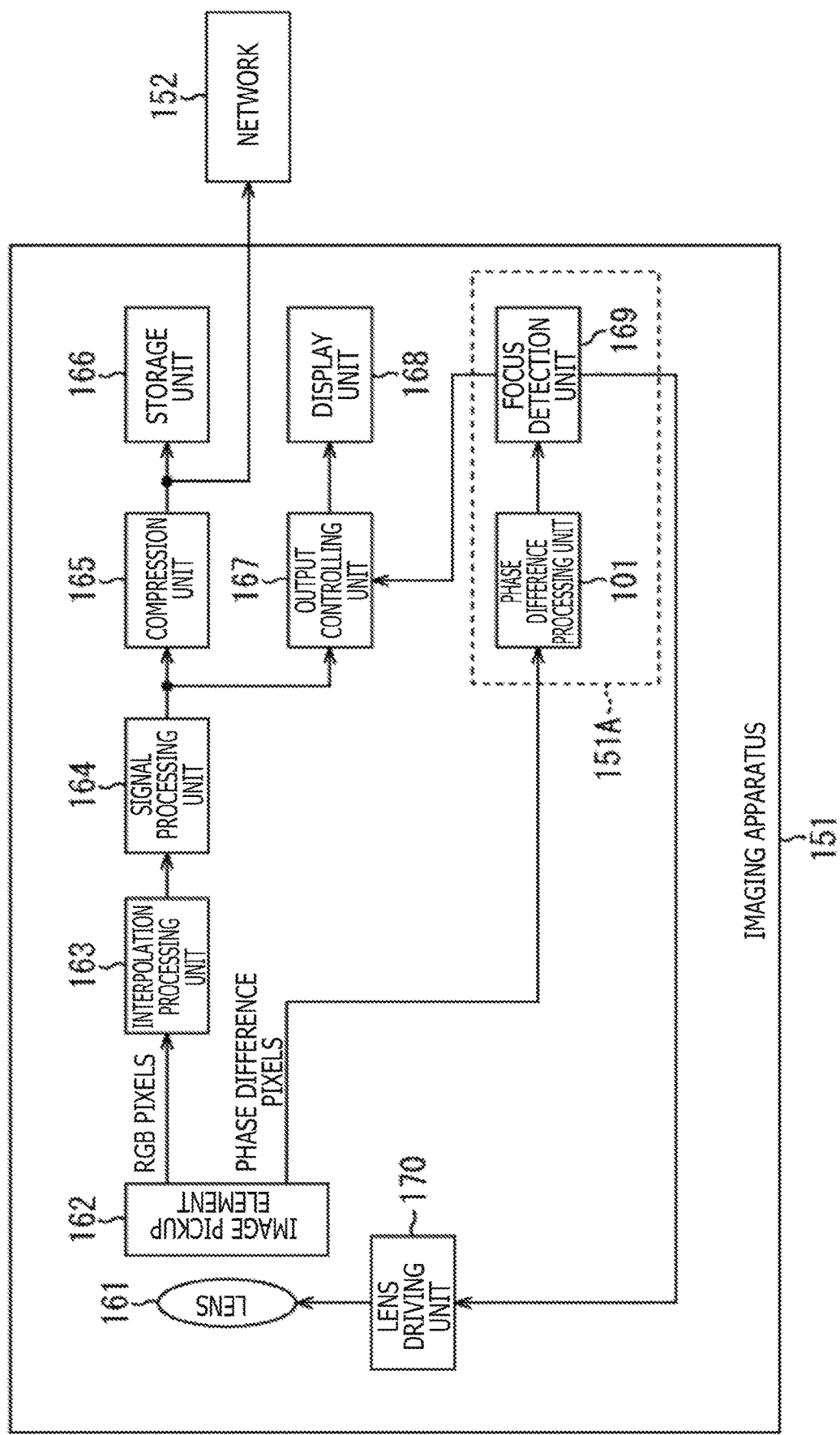
FIG. 9 is a block diagram depicting an example of a configuration of an imaging apparatus to which the present technology is applied.

FIG. 9 is a block diagram depicting an example of a configuration of an imaging apparatus to which the present technology is applied.

The imaging apparatus 151 includes a lens 161, an image pickup element 162, an interpolation processing unit 163, a signal processing unit 164, a compression unit 165, a storage unit 166, an output controlling unit 167, and a display unit 168. The imaging apparatus 151 further includes the phase difference processing unit 101 described hereinabove with reference to FIG. 7 or 8, a focus detection unit 169 and a lens driving unit 170. The phase difference processing unit 101 and the focus detection unit 169 correspond to a focus detection device 151A.

Light from an imaging target is introduced into the image pickup element 162 through the lens 161. The image pickup element 162 includes a pixel array unit in which pixels are arrayed. In the pixel array unit, RGB pixels and phase difference pixels are arrayed in a predetermined order. The image pickup element 162 photoelectrically converts incident light and A/D converts the pixel value of each pixel of the pixel array unit to generate a signal of the pixel. At this time, the image pickup element 162 outputs signals from RGB pixels from among the plurality of pixels configuring the pixel array unit to the interpolation processing unit 163.

The image pickup element 162 records signals from the plurality of pixels configuring the pixel array unit temporarily into a frame memory not depicted. Then, the image pickup element 162 sequentially outputs signals of phase difference pixels from among the pixels recorded in the frame memory and outputs the read out signals to the phase difference processing unit 101.

It is to be noted that, since the image pickup element 162 can temporarily store signals from all pixels into the frame memory, the image pickup element 162 need not necessarily output signals of RGB pixels and signals of phase difference pixels in parallel at a same timing to the interpolation processing unit 163 and the phase difference processing unit 101, respectively. In particular, the image pickup element 162 can output signals of phase difference pixels after signals of RGB pixels are outputted and also can output signals of RGB pixels after signals of phase difference pixels are outputted. Obviously, it is a matter of course that the image pickup element 162 can output signals of RGB pixels and signals of phase difference pixels in parallel to the interpolation processing unit 163 and the phase difference processing unit 101, respectively.

The interpolation processing unit 163 generates a plain image for each of RGB by performing a color separation process such as a demosaic process for generating a pixel signal of a missing color in response to an array of color filters such as, for example, a Bayer array and supplies the generated images to the signal processing unit 164.

The signal processing unit 164 performs signal processes such as gamma correction and white balance adjustment for the images after the interpolation process and outputs images after the signal processes to the compression unit 165 and the output controlling unit 167.

The compression unit 165 converts the images after the signal processes into image signals of a predetermined compression format such as JPEG (Joint Photographic Experts Group), TIFF (Tag Image File Format), or GIF (Graphics Interchange Format). The compression unit 165 stores the image signals after the conversion into the storage unit 166 or functions as a communication unit and transmits the image signals after the conversion to another apparatus or a server through a network 152.

It is to be noted that, although an example in which the compression unit 165 converts images after signal processes is described above, data of the RAW format may be stored as it is or may be transmitted to another apparatus or a server.

The storage unit 166 includes any of an HDD (Hard Disk Drive), an SSD (Solid State Drive), a semiconductor memory and so forth or a combination of them.

The output controlling unit 167 controls the display unit 168 to display the images after the signal processes. The output controlling unit 167 controls the display unit 168 to display an operation screen image for performing focus assist upon manual focus adjustment on the basis of a defocus amount detected by the focus detection unit 169.

The display unit 168 includes an LCD (Liquid Crystal Display). The display unit 168 displays an image from the output controlling unit 167.

The phase difference processing unit 101 receives signals of phase difference pixels from the image pickup element 162 as inputs thereto as described hereinabove with reference to FIG. 7 or 8 and performs a phase difference detection process, and then outputs defocus amount related information to the focus detection unit 169.

The focus detection unit 169 calculates a defocus amount on the basis of the defocus amount related information and outputs the defocus amount to the lens driving unit 170. The focus detection unit 169 supplies the calculated defocus amount to the output controlling unit 167 in order to display an operation screen image for performing focus assist.

The lens driving unit 170 calculates a driving amount on the basis of the defocus amount from the focus detection unit 169 and drives the lens 161 with the driving amount.

<Motion of Imaging Apparatus>

Figure 10:
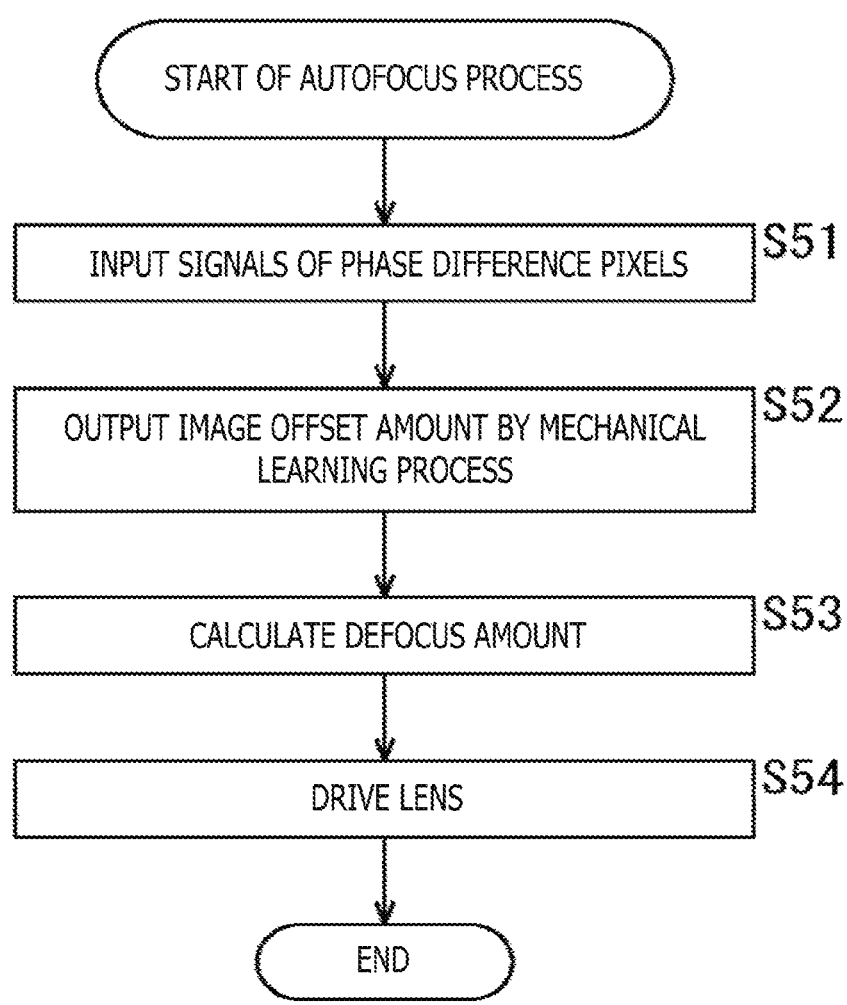
FIG. 10 is a flow chart illustrating an autofocus process of the phase difference processing unit of FIG. 7.

Now, an autofocus process in the case of the phase difference processing unit 101 of FIG. 7 is described with reference to a flow chart of FIG. 10. It is to be noted that FIG. 10 illustrates an example in which an image offset amount is outputted as the defocus amount related information.

In step S51, the phase difference processing unit 101 receives signals of a pair of phase difference pixels from the image pickup element 162 as inputs thereto.

Figure 11:
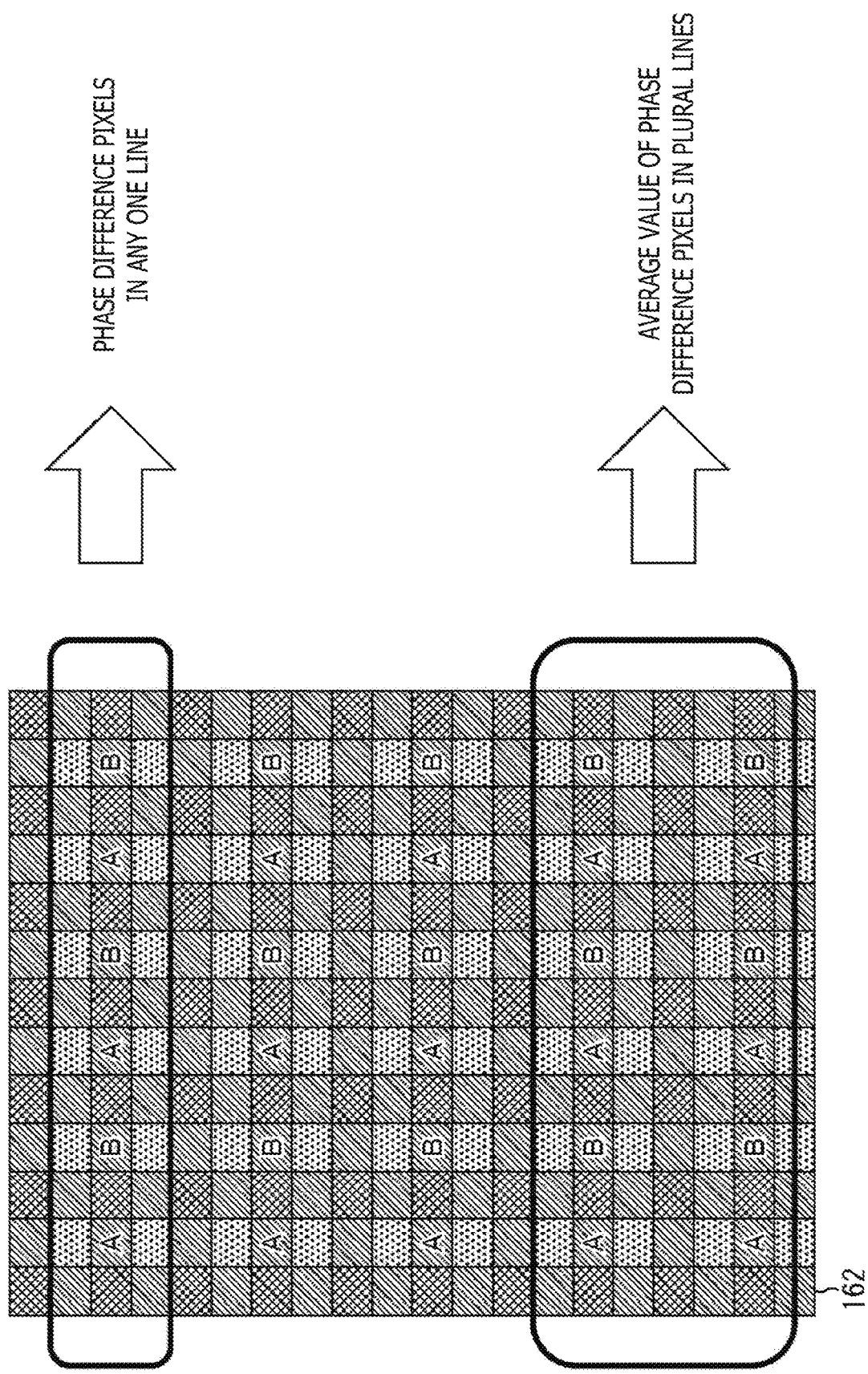
FIG. 11 is a view illustrating an example of a pixel input from image pickup elements.

FIG. 11 is a view illustrating an example of pixel inputs from the pixel array unit of the image pickup element 162. A pixel denoted by "A" represents an A pixel from between a pair of phase difference pixels, and a pixel denoted by "B" represents a B pixel from between the phase difference pixels. A pixel not indicated by any of "A" and "B" represents one of RGB pixels.

To the phase difference processing unit 101, signals of A pixels and B pixels are inputted which are phase difference pixels of any one line from the pixel array of the image pickup element 162 as indicated at an upper stage in FIG. 11.

As an alternative, an average value of signals of A pixels and B pixels that are phase difference pixels of a plurality of lines from the pixel array of the image pickup element 162 by addition in the image pickup element 162 as depicted at a lower stage in FIG. 11 is inputted to the phase difference processing unit 101.

Referring back to FIG. 10, in step S52, the mechanical learning processing unit 111 of the phase difference processing unit 101 outputs an image offset amount by a mechanical learning process to the focus detection unit 169.

In step S53, the focus detection unit 169 calculates a defocus amount on the basis of the image offset amount and outputs the defocus amount to the lens driving unit 170.

In step S54, the lens driving unit 170 calculates a driving amount on the basis of the defocus amount from the focus detection unit 169 to drive the lens 161. Consequently, the focus of the imaging apparatus 151 can be adjusted.

Figure 12:
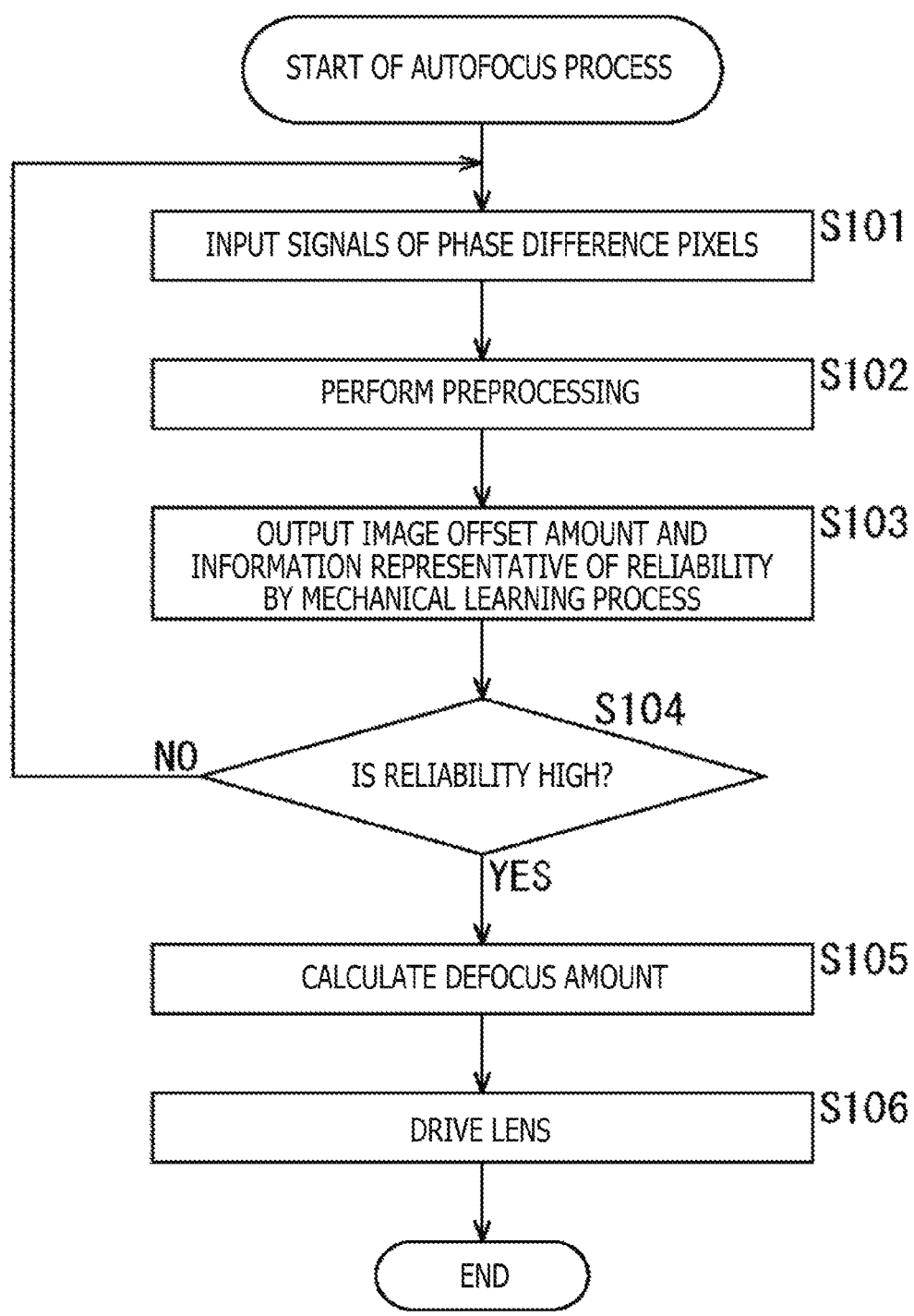
FIG. 12 is a flow chart illustrating an autofocus process of the phase difference processing unit of FIG. 8.

Now, an autofocus process in the case of the phase difference processing unit 101 of FIG. 8 is described with reference to a flow chart of FIG. 12. It is to be noted that FIG. 12 illustrates an example in which an image offset amount is outputted as defocus amount related information.

In step S101, the phase difference processing unit 101 receives signals of a pair of phase difference pixels from the image pickup element 162 as inputs thereto.

In step S102, the preprocessing unit 121 of the phase difference processing unit 101 performs any preprocess from among the first to fifth processes described hereinabove for the signals of the A pixel and the B pixel, which are the pair of phase difference pixels, inputted thereto and outputs signals of phase difference pixels after the preprocess to the mechanical learning processing unit 122.

In step S103, the mechanical learning processing unit 122 outputs an image offset amount and reliability information by a mechanical learning process to the focus detection unit 169.

In step S104, the reliability decision unit 123 receives the image offset amount and the reliability information of the image offset amount as inputs thereto and decides on the basis of the reliability information whether or not the reliability of the image offset amount is high.

In the case where it is decided in step S104 that the reliability of the image offset amount is high, the reliability decision unit 123 outputs the image offset amount to the focus detection unit 169, whereafter the process advances to step S105.

In step S105, the focus detection unit 169 calculates a defocus amount on the basis of the image offset amount and outputs the defocus amount to the lens driving unit 170.

In step S106, the lens driving unit 170 calculates a driving amount on the basis of the defocus amount from the focus detection unit 169 to drive the lens 161. Consequently, the focus of the imaging apparatus 151 can be adjusted.

On the other hand, in the case where it is decided in step S104 that the reliability of the image offset amount is low, the image offset amount is removed, and the process returns to step S101 to repeat the processes at the steps beginning with step S101.

Actually, the processes in steps S101 to S104 are processes performed in regard to a plurality of detection frames. The values of a detection frame with regard to which it is decided in step S104 that the reliability is low from among the plurality of detection frames are removed. On the other hand, the representative value is calculated from among the values of a detection frame with regard to which it is decided in step S104 that the reliability is high from among the plurality of detection frames.

The representative value is obtained as a simple average value or a value highest in reliability or by foreground imaging target priority or the like. The representative value calculated in step S105 is used as an image offset amount in calculation.

It is to be noted that, although the foregoing description is directed to an example in which a defocus amount calculated by the present technology is used for autofocus, the defocus amount can be used not only for autofocus but also in other processes relating to focus detection such as focus assist.

<Example of Output from Mechanical Learning Processing Unit>

Figure 13:
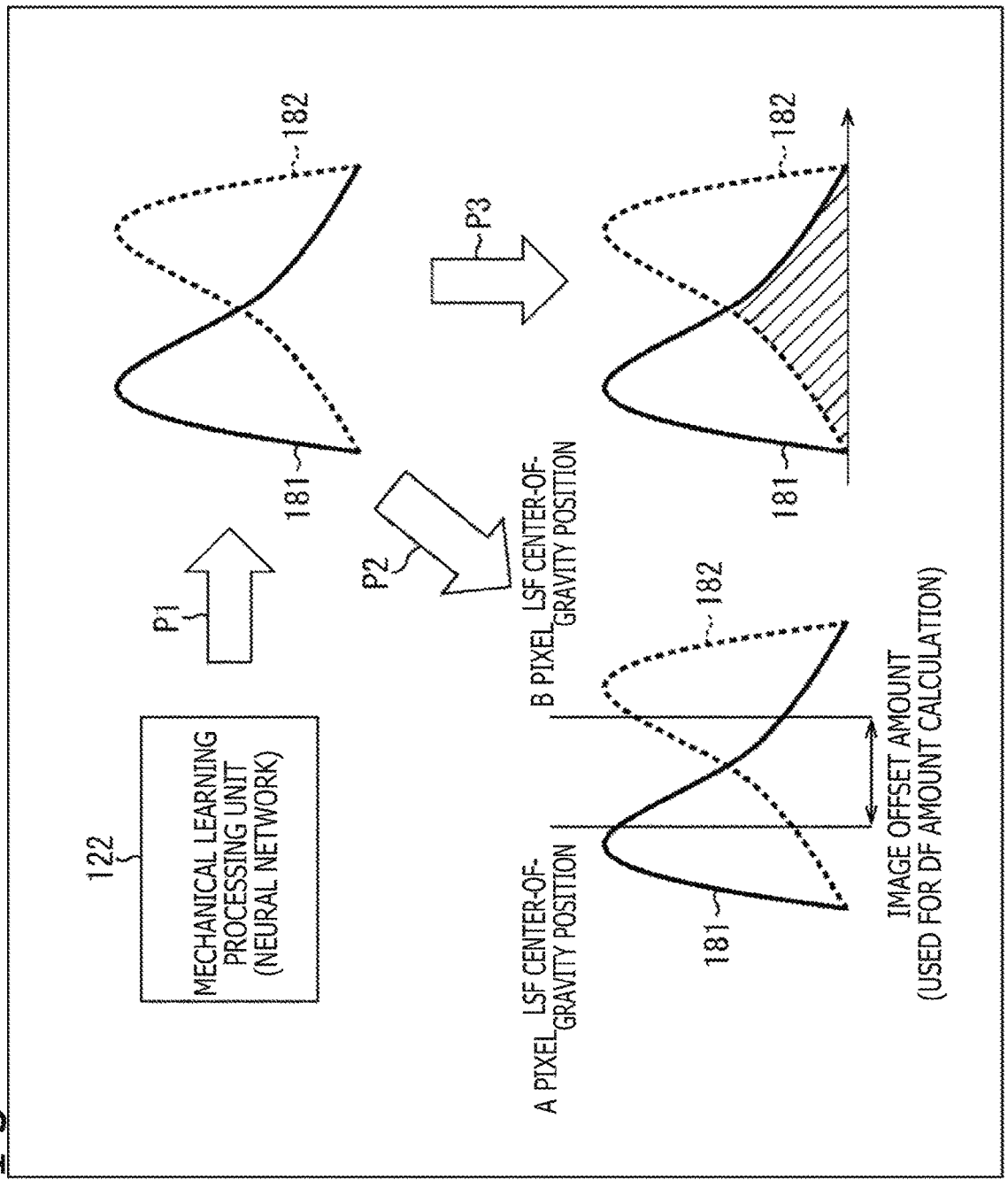
FIG. 13 is a view illustrating an example of an output of a mechanical learning processing unit of FIG. 8.

FIG. 13 is a view illustrating an output from the mechanical learning processing unit of FIG. 8.

The mechanical learning processing unit 122 outputs an LSF 181 of the A pixel and an LSF 182 of the B pixel as defocus amount related information as indicated by an arrow mark P1.

Since an image offset amount used for calculation of a defocus amount can be calculated from the center-of-gravity position of the LSF 181 of the A pixel and the center-of-gravity position of the LSF 182 of the B pixel as indicated by an arrow mark P2, the mechanical learning processing unit 122 may output an image offset amount.

The processes till now are similar to those of the case of the mechanical learning processing unit 111 of FIG. 7 described hereinabove.

Further, in the case of the mechanical learning processing unit 122, as indicated by an arrow mark P3, similarity information indicative of an index regarding by what degree the LSF 181 of the A pixel and the LSF 182 of the B pixel have properties as mirror images may be outputted as the reliability information for performing decision of whether or not the LSFs outputted from the mechanical learning processing unit 122 are reliable.

In the case of FIG. 13, as the index, namely, as an index value, a common portion area of the LSF 181 of the A pixel and the LSF 182 of the B pixel is indicated. If the common portion area that is the index value is within threshold values, then it is decided that a supposed LSF shape is obtained. The representation "within threshold values" signifies that the common portion area is equal to or smaller than a predetermined upper limit value but is equal to or greater than a predetermined lower limit value.

In particular, a region indicated by slanting lines is the common portion, and if calculation A is the area of a range defined by the LSF 181 of the A pixel and the axis of abscissa and calculation B is the area of a range defined by the LSF 182 of the B pixel and the axis of abscissa, then the common portion area can be calculated by the following expression (4).

[Math. 4]

$$\text{Common portion area} = \frac{(\text{Calculation } A \text{ AND Calculation } B)}{(\text{Calculation } A \text{ OR Calculation } B)} \quad (4)$$

Figure 14:
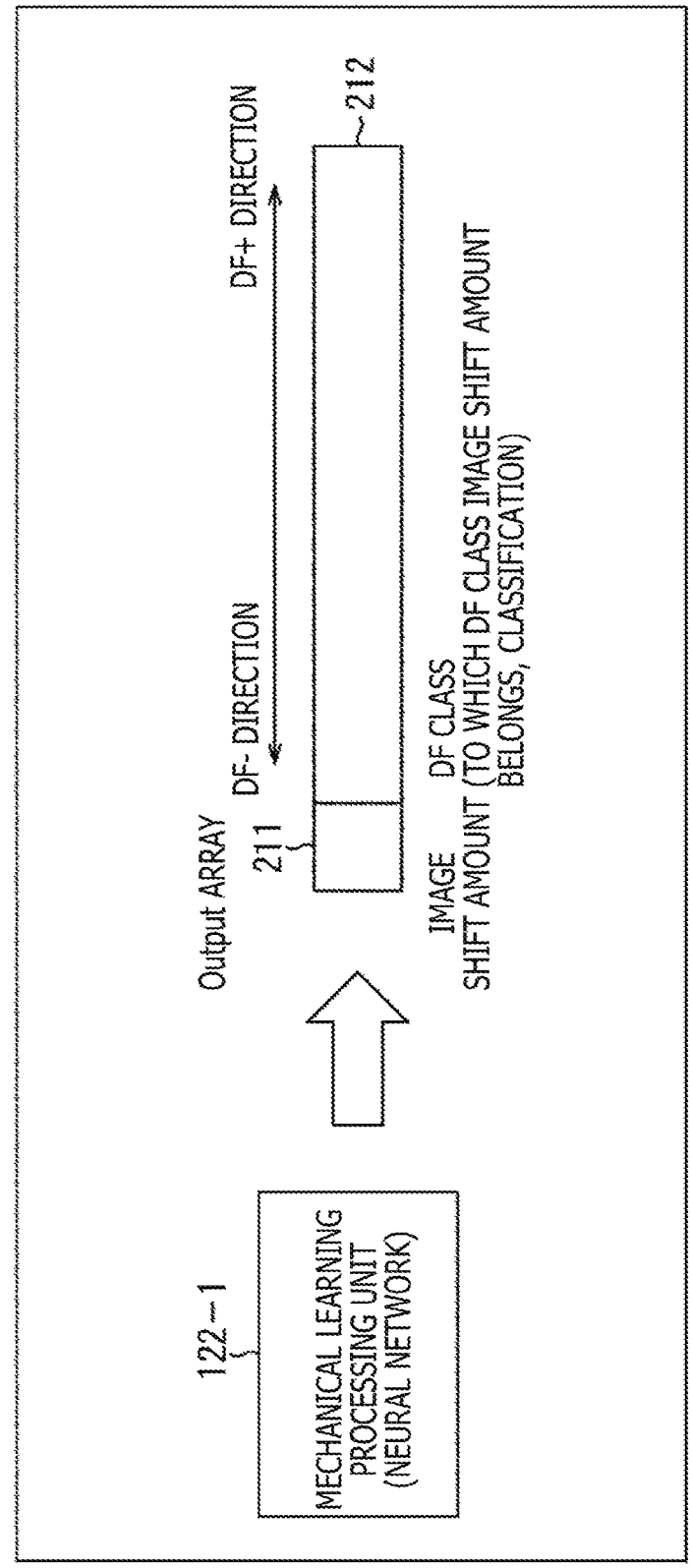
FIG. 14 is a view depicting an example of a reliability parameter (DF class) outputted from the mechanical learning processing unit of FIG. 8.

FIG. 14 is a view illustrating an example of an output from the mechanical learning processing unit of FIG. 8. In the case of FIG. 14, an image offset amount and a reliability parameter (DF class) that is reliability information are outputted.

A mechanical learning processing unit 122-1 of FIG. 14 outputs an image shift amount 211 regarding an inputted waveform and a DF class 212 that is a reliability parameter in an Output array. The DF class 212 is information of classification regarding to which DF class the image shift amount 211 belongs. In the DF class 212, a DF class in the negative direction is placed on the left side and a DF class in the positive direction is placed on the right side.

The reliability decision in the case of FIG. 14 is performed by checking the consistency (Consistency). Both the image shift amount 211 and the DF class 212 are physical quantities that rely upon the defocus amount. The consistency checked by the reliability decision represents that, if an image offset amount is determined, then a corresponding DF class 212 is uniquely determined.

Figure 15:
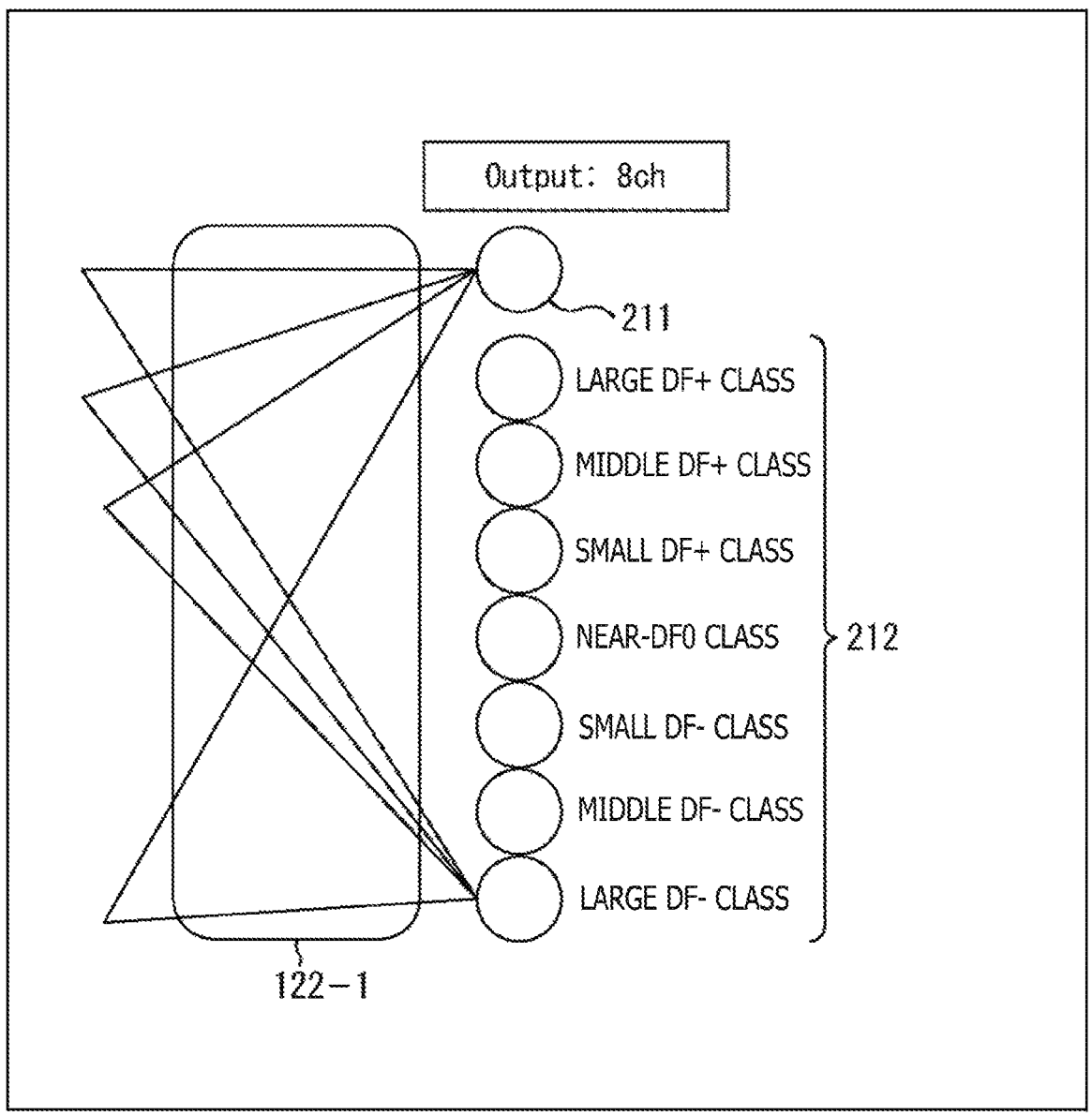
FIG. 15 is a view depicting another example of the reliability parameter (DF class) outputted from the mechanical learning processing unit of FIG. 8.

FIG. 15 is a view of a result of modeling of the reliability parameter of FIG. 14. In the case of FIG. 15, the mechanical learning processing unit 122-1 outputs data of 8 ch including an image shift amount 211 of 1 ch and DF classes 212 of 7 ch.

The DF classes 212 include a large DF+ class, a middle DF+ class, a small DF+ class, a near-DF0 class, a small DF− class, a middle DF− class, and a large DF− class.

In order from above, the large DF+ class is a class of defocus amounts that are great in the positive direction; the middle DF+ class is a class of defocus amounts that are middle in the positive direction; and the small DF+ class is a class of focus amounts that are small in the positive direction.

The near-DF0 class is a class of defocus amounts that are near to 0, and the small DF− class is a class of defocus amounts that are small in the negative direction. The middle DF− class is a class of defocus amounts that are middle in the negative direction. The large DF− class is a class of defocus amounts that are great in the negative direction.

Figure 16:
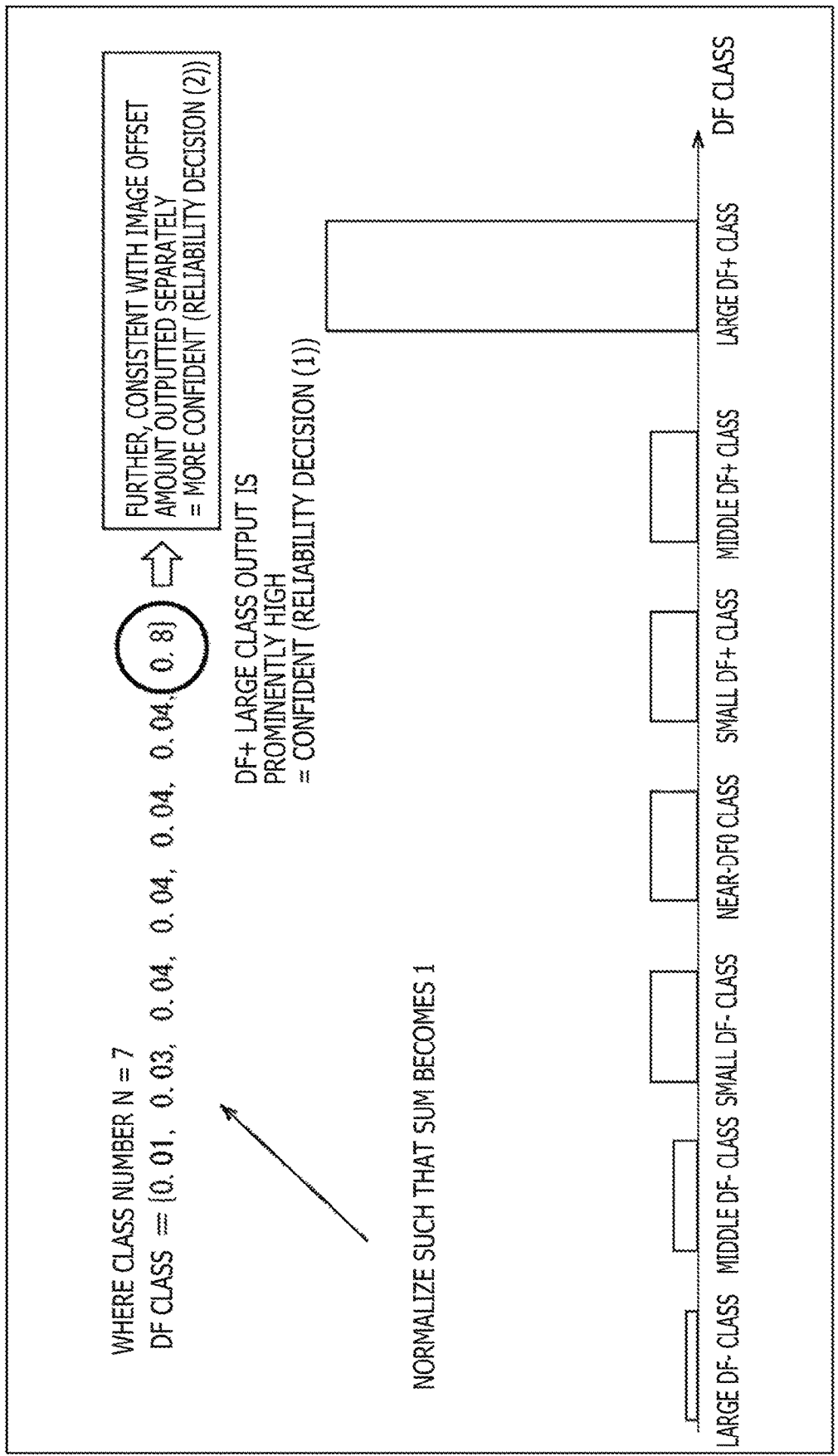
FIG. 16 is a view illustrating an example of an output of the reliability parameter in the case where the reliability is high.

Further, the reliability parameter is described in detail with reference to FIGS. 16 to 18. FIG. 16 is a view illustrating an example of the reliability parameter in the case where the reliability is high (reliability is confident). The values of the reliability of the DF classes of FIG. 16 are 0.01 in the large DF− class, 0.03 in the middle DF− class, 0.04 in the small DF− class, 0.04 in the near-DF0 class, 0.04 in the small DF+ class, 0.04 in the middle DF+ class, and 0.8 in the large DF+ class in order from the left. Below FIG. 16, the values of the reliability of the DF classes are represented by bar graphs. It is to be noted that the values of the reliability of the DF classes are normalized such that the sum of them becomes 1. This similarly applies also to FIGS. 17 and 18 in the followings.

In the case of FIG. 16, reliability decision is performed at two stages for an imaging offset amount. since the value of the reliability in the large DF+ class is 0.8 and is prominently high from values of the reliability of the other classes, by the reliability decision (1) at the first stage, it is decided that the reliability is confident. Thereafter, reliability decision (2) at the second stage for deciding whether there is consistency also with an image offset value outputted separately is performed, and if there is consistency also with the image offset amount, it is decided that the reliability is more confident. It is to be noted that the decision may be performed not at two stages but at one stage or at a plurality of two or more stages.

Figure 17:
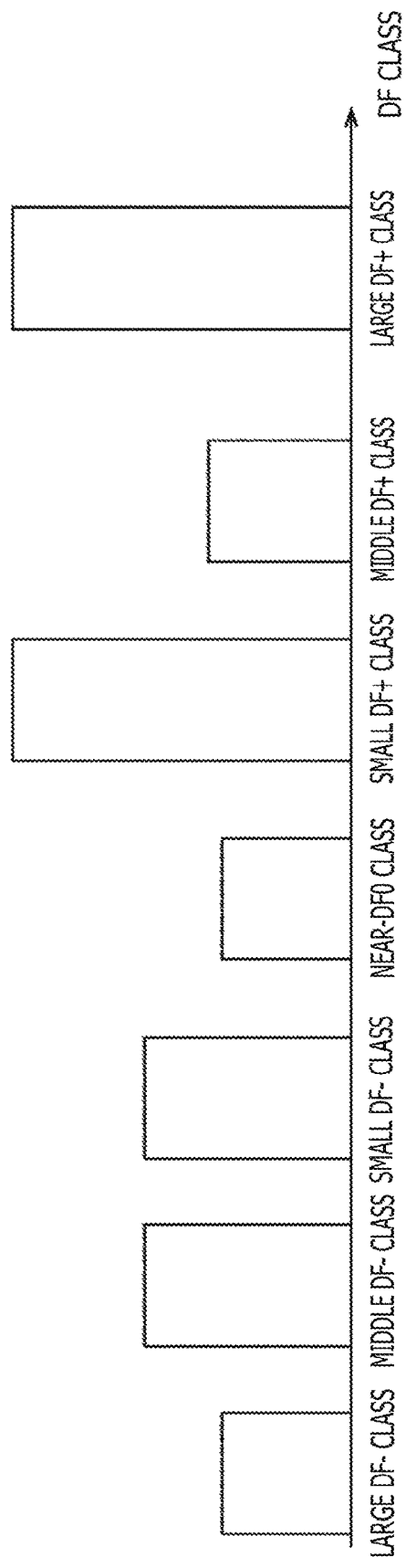
FIG. 17 is a view illustrating an example of an output of the reliability parameter in the case where the reliability is low.

FIG. 17 is a view depicting an output example 1 of the reliability parameter in the case where the reliability is low (reliability is not confident). The values of the reliability of the DF classes in FIG. 17 are 0.1 in the large DF− class, 0.15 in the middle DF− class, 0.15 in the small DF− class, 0.1 in the near-DF0 class, 0.2 in the small DF+ class, 0.1 in the middle DF+ class, and 0.2 in the large DF+ class in order from the left.

In the case of FIG. 17, since a class whose reliability is prominently high does not exist, in the reliability decision, it is decided that the reliability is not confident.

Figure 18:
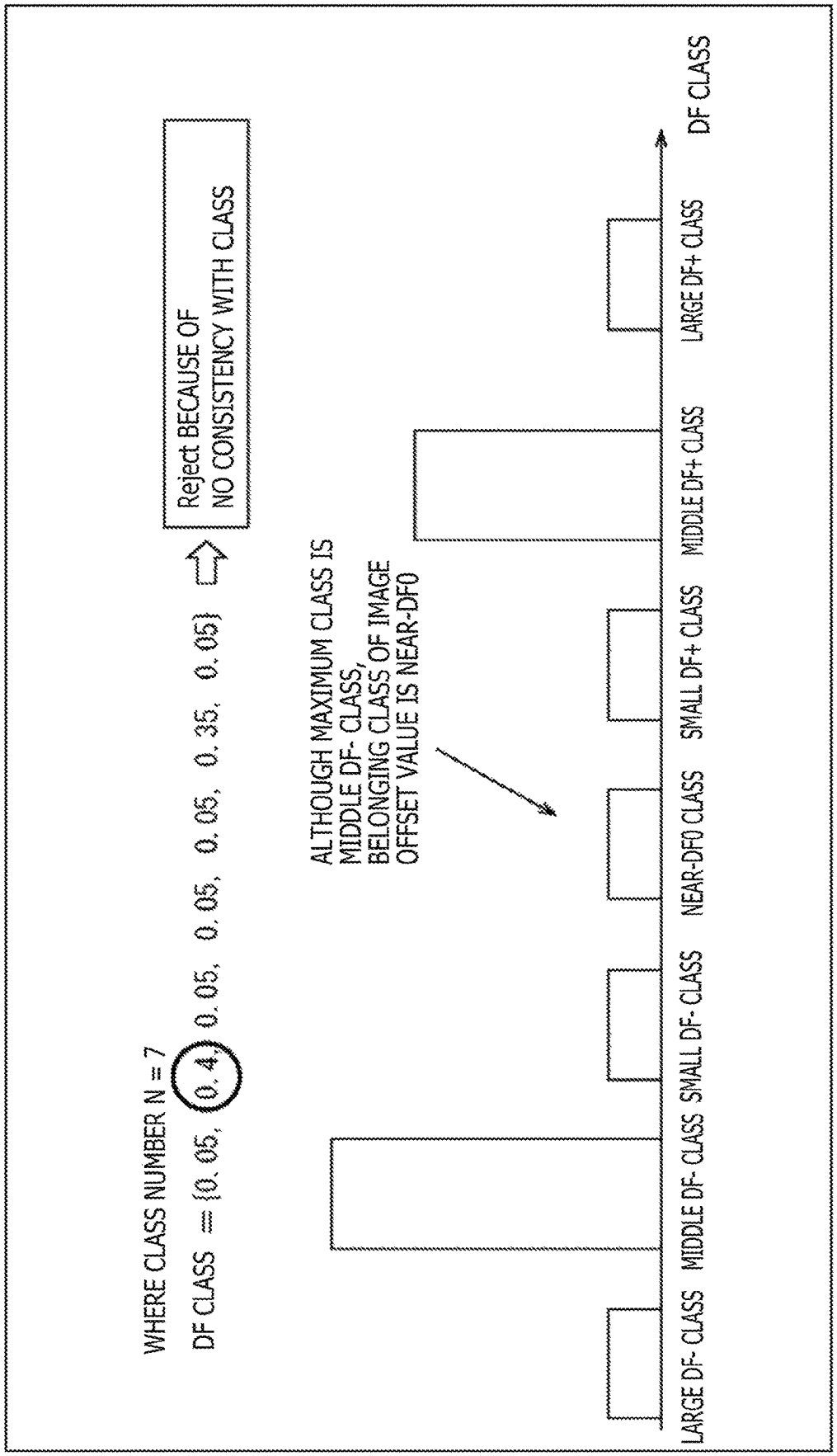
FIG. 18 is a view illustrating another example of an output of the reliability parameter in the case where the reliability is low.

FIG. 18 is a view depicting an output example 2 of the reliability parameter in the case where the reliability is low (reliability is not confident). The values of the reliability of the DF classes in FIG. 18 are 0.05 in the large DF− class, 0.4 in the middle DF− class, 0.05 in the small DF− class, 0.05 in the near-DF0 class, 0.05 in the small DF+ class, 0.35 in the middle DF+ class, and 0.05 in the large DF+ class in order from the left.

In the case of FIG. 18, although the class of a maximum reliability value is the middle DF− class whose reliability value is 0.4, the belonging class of the image offset amount outputted separately is the near-DF0 class whose reliability value is 0.05. In particular, since the image offset amount and the DF class are not consistent, in the reliability decision, it is decided that the reliability is not confident, and the image offset amount is removed (Reject).

Figure 19:
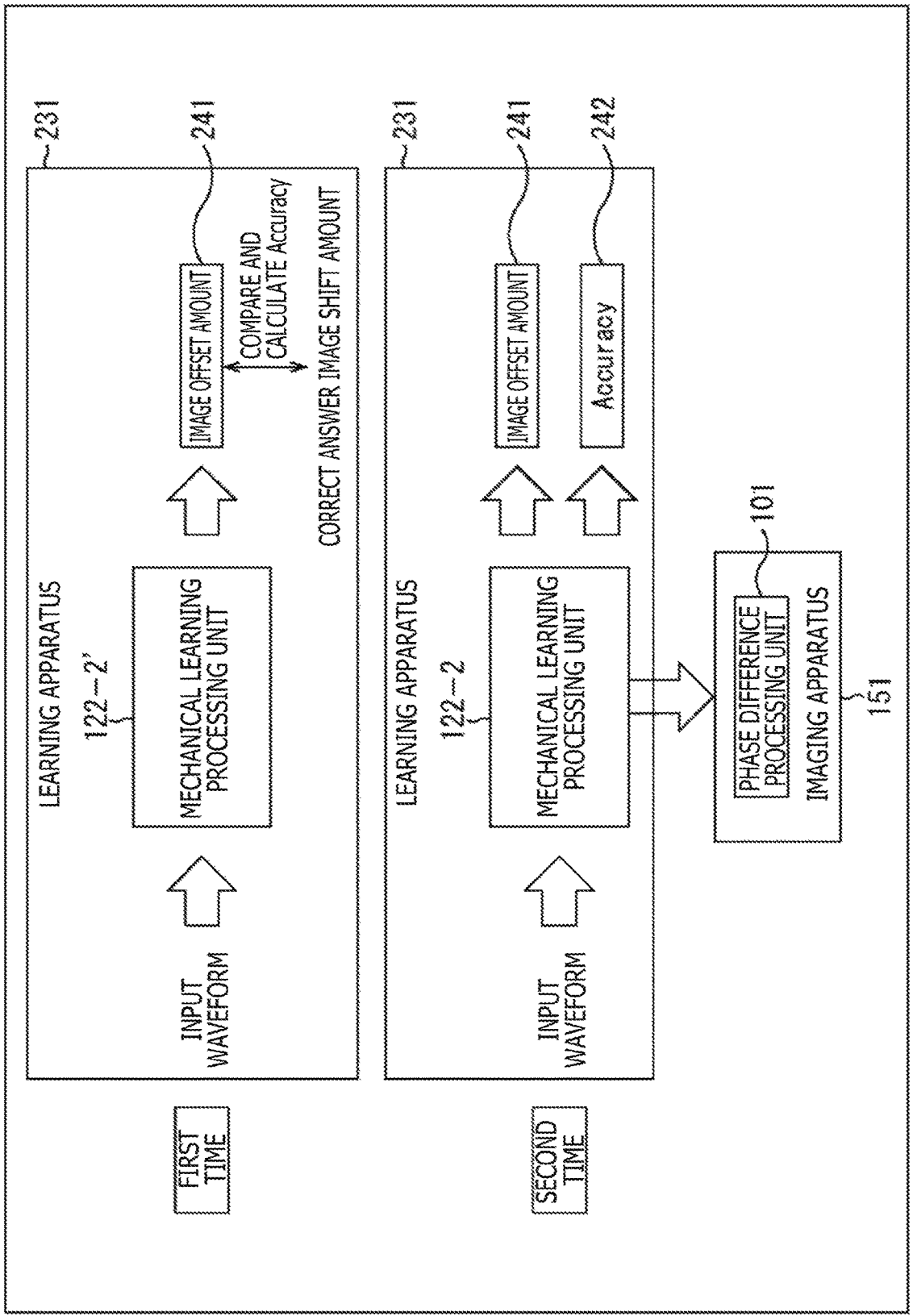
FIG. 19 is a view depicting an example of the reliability parameter outputted from the mechanical learning processing unit of FIG. 8.

FIG. 19 is a view illustrating, as another example of an output from the mechanical learning processing unit of FIG. 8, an example in which an image offset value and a reliability parameter (Accuracy: accuracy) are outputted.

In FIG. 19, a mechanical learning processing unit 122-2' upon learning and a created mechanical learning processing unit 122-2 in a learning apparatus 231 are depicted. The learning apparatus 231 includes a computer and causes the mechanical learning processing unit 122-2' to learn using a plurality of learning data to create the mechanical learning processing unit 122-2 that is a neural network.

The Accuracy is represented by the following expression (5) and indicates a more accurate value as it comes near to 1.

[Math. 5]

Accuracy=Calculated image offset amount/Correct-answer image offset amount (5)

Upon learning for the first time, the mechanical learning processing unit 122-2' receives an input waveform as an input thereto and outputs an image offset amount 241. Along with this, since the learning apparatus 231 has a correct answer image offset value of the input waveform as teacher data, the Accuracy is outputted through comparison between the image offset amount 241 and the correct answer image offset amount.

Upon learning for the second time, the mechanical learning processing unit 122 receives an input waveform as an input thereto and outputs an image offset amount 241 and Accuracy 242. In the case where the Accuracy 242 outputted at this time is excessively different from 1, it is excluded.

The mechanical learning processing unit 122-2' upon learning for the first time and the mechanical learning processing unit 122-2 upon learning for the second time are a same neural network except that the output is different.

In this manner, the learning for the first time is learning for finding what waveform is high or low in Accuracy, and what is actually incorporated in the phase difference processing unit 101 of the imaging apparatus 151 is the mechanical learning processing unit 122-2 after the learning for the second time. By causing the mechanical learning processing unit 122-2' to learn what Accuracy the input waveform has for the first time, the mechanical learning processing unit 122-2 for the second time can output an image offset amount 241 and Accuracy 242 with an input waveform inputted thereto.

<Example of Configuration of Learning Apparatus>

Figure 20:
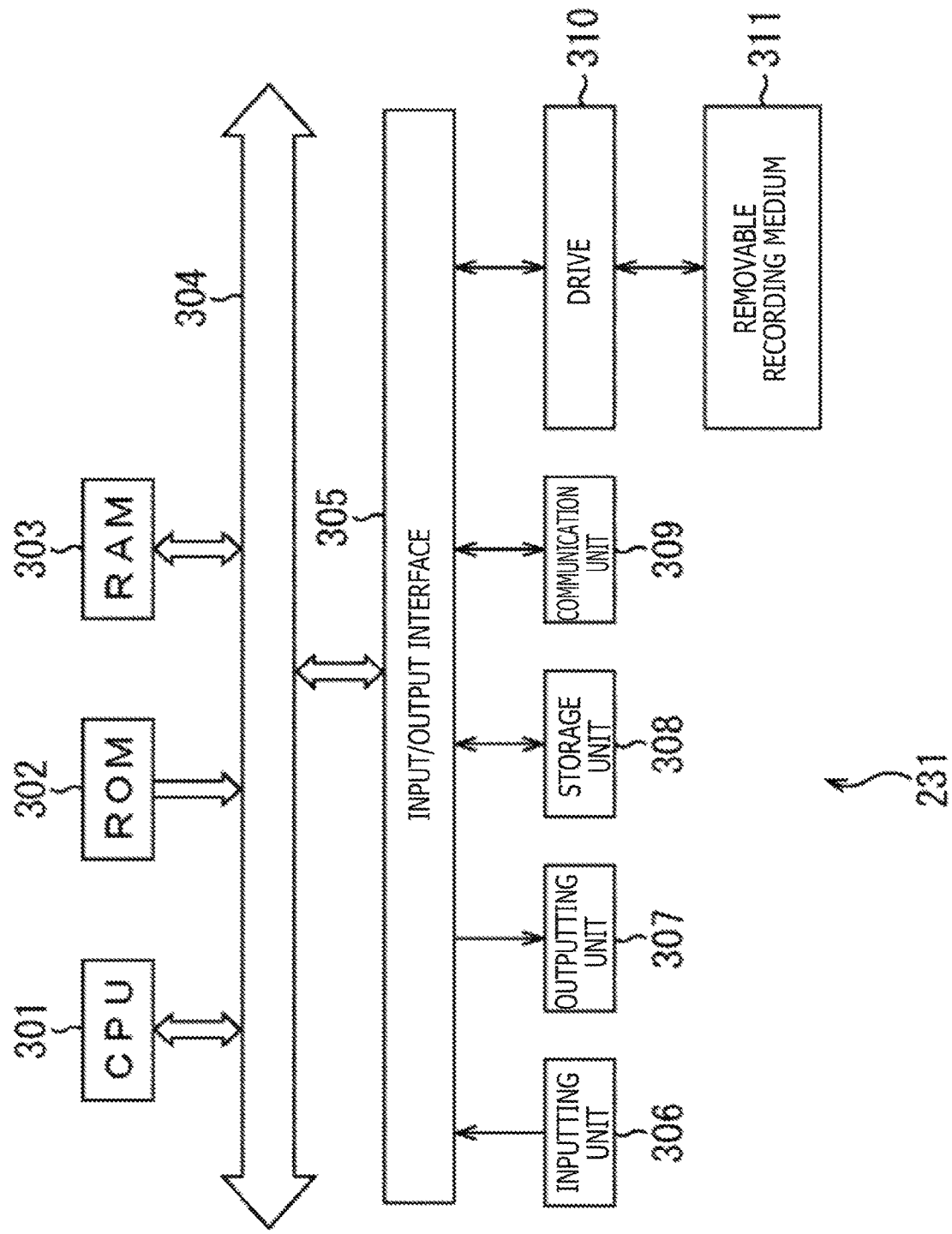
FIG. 20 is a block diagram depicting an example of a hardware configuration of a learning apparatus.

FIG. 20 is a block diagram depicting an example of a hardware configuration of the learning apparatus 231.

In the learning apparatus 231, a CPU 301, a ROM 302, and a RAM 303 are connected to each other by a bus 304. To the bus 304, an input/output interface 305 is connected further.

To the input/output interface 305, an inputting unit 306 including a keyboard and a mouse, and an outputting unit 307 including a display and a speaker are connected. Further, to the input/output interface 305, a storage unit 308, a communication unit 309, and a drive 310 are connected.

The storage unit 308 includes a hard disk or a nonvolatile memory and stores a neural network (mechanical learning processing unit 111, mechanical learning processing unit 122-1, and mechanical learning processing unit 122-2) created by mechanical learning.

The communication unit 309 includes a network interface and establishes connection to a network by wireless or wired communication to perform communication with a server or another apparatus.

The drive 310 accesses a removable recording medium 311 to perform reading out of data stored in the removable recording medium 311 or writing of data into the removable recording medium 311.

Mechanical learning of a neural network is implemented by a predetermined program executed by the CPU 301 of FIG. 20. It is to be noted that mechanical learning of a neural network may otherwise be performed by the imaging apparatus 151.

Figure 21:
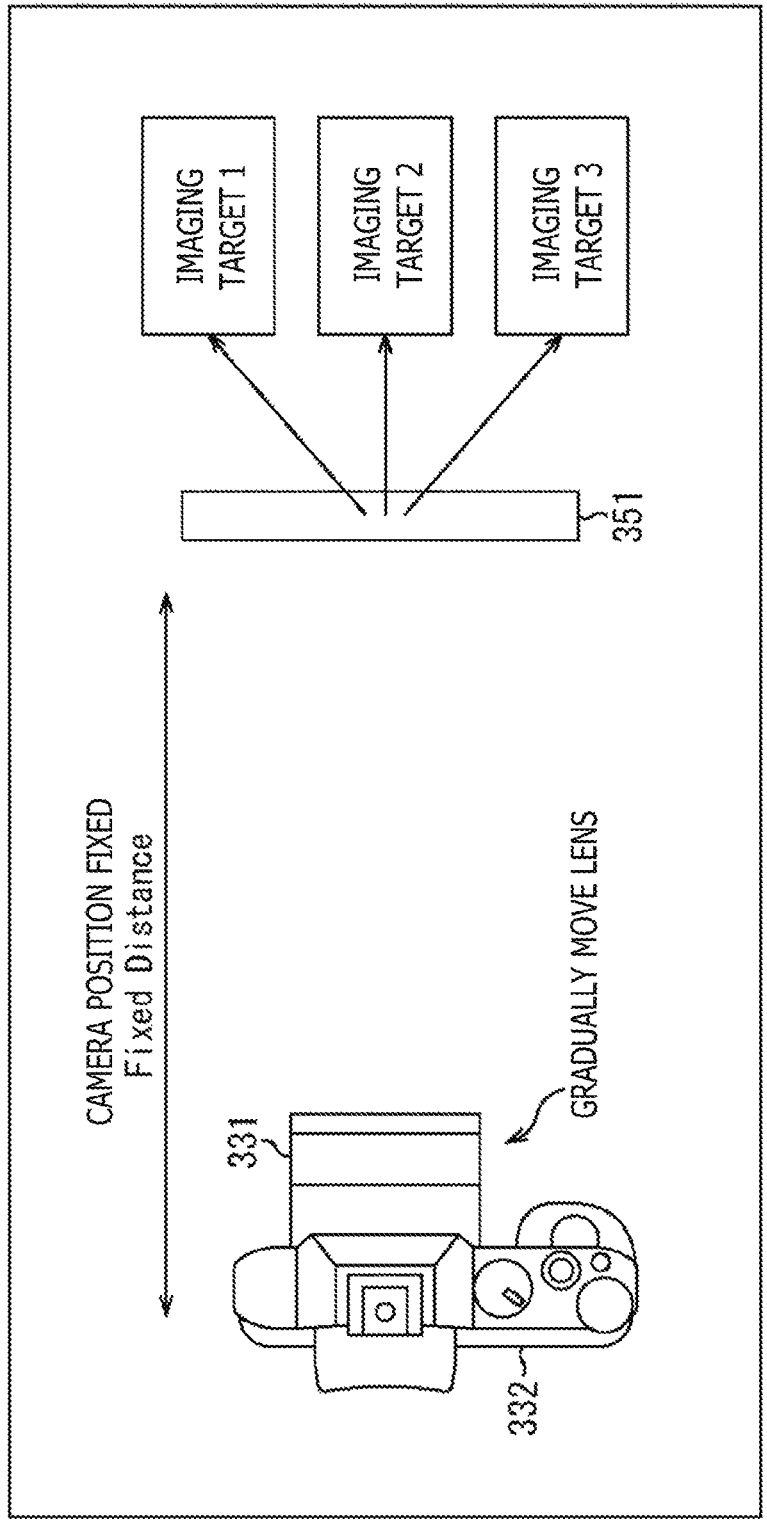
FIG. 21 is a view illustrating a collection method 1 of learning data used in learning of a neural network.

FIG. 21 is a view illustrating a collection method 1 of learning data to be used for learning of a neural network. FIG. 21 depicts an example in which an imaging target is actually measured to collect learning data.

As depicted in FIG. 21, a method is available which uses a real thing such that, in a state in which the position of a camera 332 is fixed and the position of an imaging target 351 is fixed, the position of a lens 331 of the camera 332 is gradually moved while the imaging target 351 in various pictures is imaged. An imaging target 1, another imaging target 2, and a further imaging target 3 are imaging targets that are different in picture from one another. In this case, since the driving amount of the lens 331 is known and the distance between the camera 332 and the imaging target 351 is fixed, the defocus amount is known. Consequently, data of many imaging targets and information of the defocus amount (or defocus amount related information related to the defocus amount) can be collected as learning data.

In this case, the camera 332 may be used as a learning apparatus, or the learning apparatus 231 including a computer as depicted in FIG. 20 may perform learning to create a neural network.

<Example of Collection of Learning Data>

Figure 22:
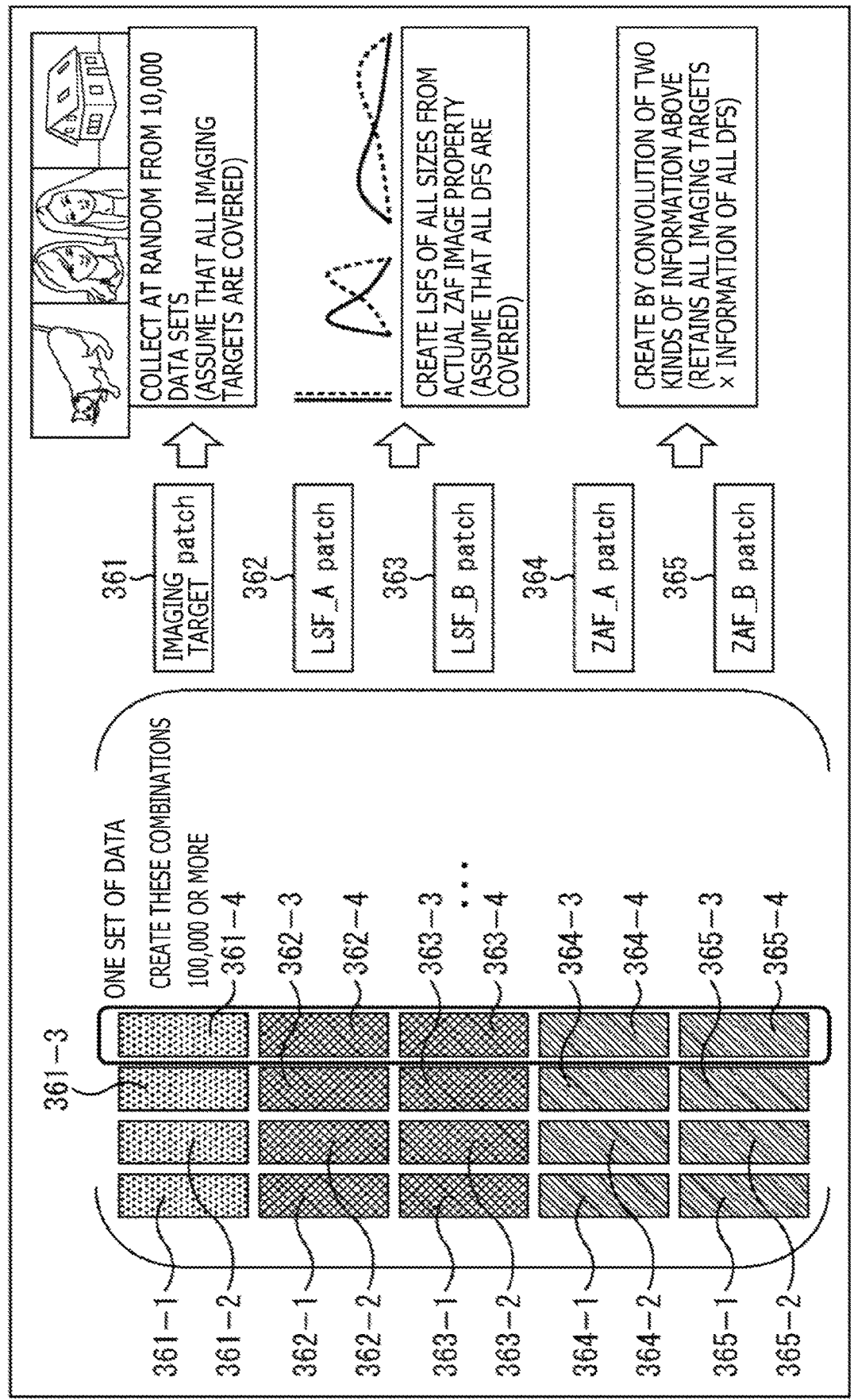
FIG. 22 is a view illustrating a collection method 2 of learning data used in learning of a neural network.

FIG. 22 is a view illustrating a collection method 2 of learning data to be used for learning of a neural network. FIG. 22 depicts an example in which learning data is collected by a simulation.

As depicted on FIG. 22, a learning apparatus 231 stores, from within a set of 10,000 image data, imaging target patch (data) 361 (361-1 to 361-n) at random into a storage unit 308.

Along with this, the learning apparatus 231 creates LSF_A patch (data) 362 (362-1 to 362-n) and LSF_B patch 363 (363-1 to 363-n) of any size from actual ZAF pixel properties. The LSF_A patch 362 and the LSF_B patch 363 are defocus amount related information.

The learning apparatus 231 convolutes any LSF patch (blurring function) into any imaging target patch 361 described above. Consequently, ZAF_A (waveform of the A pixel) patch 364 (364-1 to 364-n) and ZAF_B (waveform of the B pixel) patch 365 (365-1 to 365-n) are created.

The learning apparatus 231 creates and stores, where imaging target patch 361, LSF_A patch 362, LSF_B patch 363, ZAF_A patch 364, and ZAF_B patch 365 configure one set of data, 10,000 or more sets of the combination of them into the storage unit 308.

Consequently, the learning apparatus 231 can collect data of almost all imaging targets and information of almost all defocus amounts (or defocus amount related information relating to the defocus amounts) as learning data. In particular, if data of almost all imaging targets and information of almost all defocus amounts are available, then it can be determined which blurring function is included in an inputted waveform.

Where all combinations described above are prepared and learning is performed using the combinations, a mechanical learning processing unit 111, a mechanical learning processing unit 122-1, and a mechanical learning processing unit 122-2 that are a learned neural network are created. Then, the created neural network is incorporated as the mechanical learning processing unit 111, the mechanical learning processing unit 122-1, and the mechanical learning processing unit 122-2 into the phase difference processing unit 101 of the imaging apparatus 151.

In this manner, in the present technology, since defocus amount related information is outputted using a neural network on the basis of a received light amount distribution of a first pixel group having a first property for phase difference detection and a received light amount distribution of a second pixel group having a second property different from the first property, an accurate image offset amount can be detected.

It is to be noted that, although the foregoing description is directed to a phase difference detection process using a pair of phase difference pixels of the pupil splitting method of an imaging lens, the present technology can be applied also to a phase difference detection process that uses an autofocus (AF) module.

Further, although the foregoing description is given using phase difference pixels of the pupil splitting method, the present technology can be applied also the pixel splitting reading out method. Further, the present technology can be used for an AF function or adjustment of the focus in a surgery system hereinafter described.

The series of processes described above can be executed by hardware and also can be executed by software. In the case where the series of processes is executed by software, a program that constructs the software is installed into a computer incorporated in hardware for exclusive use, a personal computer for universal use or the like.

The program to be installed is recorded on and provided as a removable recording medium 311 depicted in FIG. 20, which is an optical disk (CD-ROM (Compact Disc-Read Only Memory), a DVD (Digital Versatile Disc) or the like), a semiconductor memory or the like. Alternatively, the program may be provided through a wired or wireless transmission medium such as a local area network, the Internet, or a digital broadcast. Also it is possible to install the program in the ROM 302 or the storage unit 308 in advance.

It is to be noted that the program to be executed by the computer may be a program by which processing is performed in a time series in accordance with the sequence described in the present specification or may be a program by which processing is performed in parallel or at a necessary timing such as when the program is called.

2. Application Example

The technology according to the present disclosure can be applied to various products. For example, the technology according to the present disclosure may be applied to a surgery room system.

Figure 23:
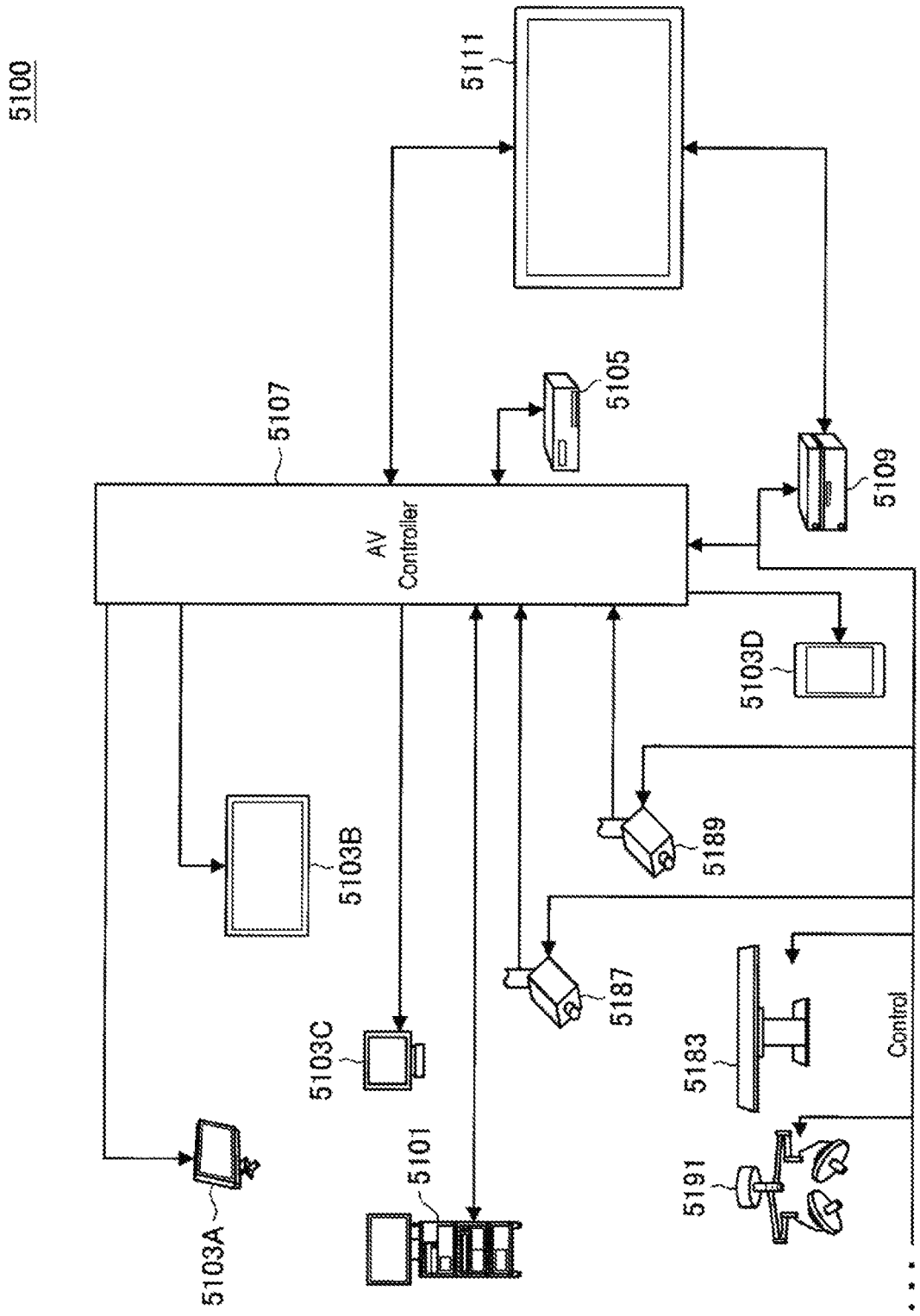
FIG. 23 is a view schematically depicting a general configuration of a surgery room system.

FIG. 23 is a view schematically depicting a general configuration of a surgery room system 5100 to which the technology according to an embodiment of the present disclosure can be applied. Referring to FIG. 23, the surgery room system 5100 is configured such that a group of apparatus installed in a surgery room are connected for cooperation with each other through an audiovisual (AV) controller 5107 and a surgery room controlling apparatus 5109.

In the surgery room, various apparatus may be installed. In FIG. 23, as an example, various apparatus group 5101 for endoscopic surgery, a ceiling camera 5187, a surgery field camera 5189, a plurality of display apparatus 5103A to 5103D, a recorder 5105, a patient bed 5183 and an illumination 5191 are depicted. The ceiling camera 5187 is provided on the ceiling of a surgery room and images the hands of a surgeon. The surgery field camera 5189 is provided on the ceiling of the surgery room and images a state of the entire surgery room.

Among the apparatus mentioned, the apparatus group 5101 belongs to an endoscopic surgery system 5113 hereinafter described and include an endoscope, a display apparatus which displays an image picked up by the endoscope and so forth. Various apparatus belonging to the endoscopic surgery system 5113 are referred to also as medical equipment. Meanwhile, the display apparatus 5103A to 5103D, the recorder 5105, the patient bed 5183 and the illumination 5191 are apparatus which are equipped, for example, in the surgery room separately from the endoscopic surgery system 5113. The apparatus which do not belong to the endoscopic surgery system 5113 are referred to also as non-medical equipment. The audiovisual controller 5107 and/or the surgery room controlling apparatus 5109 cooperatively control operation of the medical equipment and the non-medical equipment with each other.

The audiovisual controller 5107 integrally controls processes of the medical equipment and the non-medical equipment relating to image display. Specifically, each of the apparatus group 5101, the ceiling camera 5187 and the surgery field camera 5189 from among the apparatus provided in the surgery room system 5100 may be an apparatus having a function of sending information to be displayed during surgery (such information is hereinafter referred to as display information, and the apparatus mentioned is hereinafter referred to as apparatus of a sending source). Meanwhile, each of the display apparatus 5103A to 5103D may be an apparatus to which display information is outputted (the apparatus is hereinafter referred to also as apparatus of an output destination). Further, the recorder 5105 may be an apparatus which serves as both of an apparatus of a sending source and an apparatus of an output destination. The audiovisual controller 5107 has a function of controlling operation of an apparatus of a sending source and an apparatus of an output destination to acquire display information from the apparatus of a sending source and transmit the display information to the apparatus of an output destination so as to be displayed or recorded. It is to be noted that the display information includes various images picked up during surgery, various kinds of information relating to the surgery (for example, physical information of a patient, inspection results in the past or information regarding a surgical procedure) and so forth.

Specifically, to the audiovisual controller 5107, information relating to an image of a surgical region in a body lumen of a patient imaged by the endoscope may be transmitted as the display information from the apparatus group 5101. Further, from the ceiling camera 5187, information relating to an image of the hands of the surgeon picked up by the ceiling camera 5187 may be transmitted as display information. Further, from the surgery field camera 5189, information relating to an image picked up by the surgery field camera 5189 and illustrating a state of the entire surgery room may be transmitted as display information. It is to be noted that, if a different apparatus having an image pickup function exists in the surgery room system 5100, then the audiovisual controller 5107 may acquire information relating to an image picked up by the different apparatus as display information also from the different apparatus.

Alternatively, for example, in the recorder 5105, information relating to such images as mentioned above picked up in the past is recorded by the audiovisual controller 5107. The audiovisual controller 5107 can acquire, as display information, information relating to the images picked up in the past from the recorder 5105. It is to be noted that also various pieces of information relating to surgery may be recorded in advance in the recorder 5105.

The audiovisual controller 5107 controls at least one of the display apparatus 5103A to 5103D, which are apparatus of an output destination, to display acquired display information (namely, images picked up during surgery or various pieces of information relating to the surgery). In the example depicted, the display apparatus 5103A is a display apparatus installed so as to be suspended from the ceiling of the surgery room; the display apparatus 5103B is a display apparatus installed on a wall face of the surgery room; the display apparatus 5103C is a display apparatus installed on a desk in the surgery room; and the display apparatus 5103D is a mobile apparatus (for example, a tablet personal computer (PC)) having a display function.

Further, though not depicted in FIG. 23, the surgery room system 5100 may include an apparatus outside the surgery room. The apparatus outside the surgery room may be, for example, a server connected to a network constructed inside and outside the hospital, a PC used by medical staff, a projector installed in a meeting room of the hospital or the like. Where such an external apparatus is located outside the hospital, also it is possible for the audiovisual controller 5107 to cause display information to be displayed on a display apparatus of a different hospital through a teleconferencing system or the like to perform telemedicine.

The surgery room controlling apparatus 5109 integrally controls processes other than processes relating to image display on the non-medical equipment. For example, the surgery room controlling apparatus 5109 controls driving of the patient bed 5183, the ceiling camera 5187, the surgery field camera 5189 and the illumination 5191.

In the surgery room system 5100, a centralized operation panel 5111 is provided such that it is possible to issue an instruction regarding image display to the audiovisual controller 5107 or issue an instruction regarding operation of the non-medical equipment to the surgery room controlling apparatus 5109 through the centralized operation panel 5111. The centralized operation panel 5111 is configured by providing a touch panel on a display face of a display apparatus.

Figure 24:
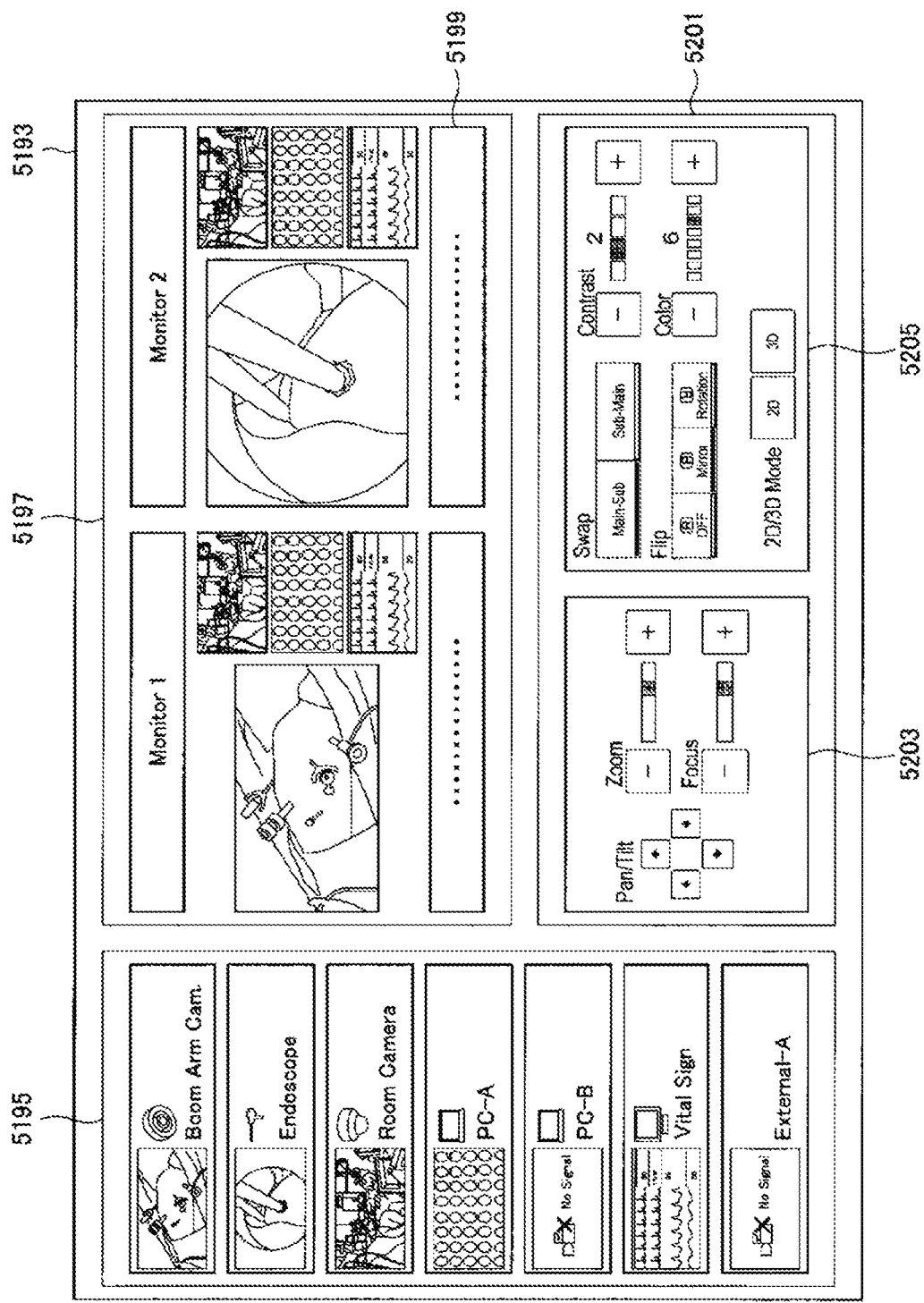
FIG. 24 is a view depicting an example of display of an operation screen image of a centralized operation panel.

FIG. 24 is a view depicting an example of display of an operation screen image on the centralized operation panel 5111. In FIG. 24, as an example, an operation screen image is depicted which corresponds to a case in which two display apparatus are provided as apparatus of an output destination in the surgery room system 5100. Referring to FIG. 24, the operation screen image 5193 includes a sending source selection region 5195, a preview region 5197 and a control region 5201.

In the sending source selection region 5195, the sending source apparatus provided in the surgery room system 5100 and thumbnail screen images representative of display information the sending source apparatus have are displayed in an associated manner with each other. A user can select display information to be displayed on the display apparatus from any of the sending source apparatus displayed in the sending source selection region 5195.

In the preview region 5197, a preview of screen images displayed on two display apparatus (Monitor 1 and Monitor 2) which are apparatus of an output destination is displayed. In the example depicted, four images are displayed by picture in picture (PinP) display in regard to one display apparatus. The four images correspond to display information sent from the sending source apparatus selected in the sending source selection region 5195. One of the four images is displayed in a comparatively large size as a main image while the remaining three images are displayed in a comparatively small size as sub images. The user can exchange between the main image and the sub images by suitably selecting one of the images from among the four images displayed in the region. Further, a status displaying region 5199 is provided below the region in which the four images are displayed, and a status relating to surgery (for example, elapsed time of the surgery, physical information of the patient and so forth) may be displayed suitably in the status displaying region 5199.

A sending source operation region 5203 and an output destination operation region 5205 are provided in the control region 5201. In the sending source operation region 5203, a graphical user interface (GUI) part for performing an operation for an apparatus of a sending source is displayed. In the output destination operation region 5205, a GUI part for performing an operation for an apparatus of an output destination is displayed. In the example depicted, GUI parts for performing various operations for a camera (panning, tilting and zooming) in an apparatus of a sending source having an image pickup function are provided in the sending source operation region 5203. The user can control operation of the camera of an apparatus of a sending source by suitably selecting any of the GUI parts. It is to be noted that, though not depicted, where the apparatus of a sending source selected in the sending source selection region 5195 is a recorder (namely, where an image recorded in the recorder in the past is displayed in the preview region 5197), GUI parts for performing such operations as reproduction of the image, stopping of reproduction, rewinding, fast-feeding and so forth may be provided in the sending source operation region 5203.

Further, in the output destination operation region 5205, GUI parts for performing various operations for display on a display apparatus which is an apparatus of an output destination (swap, flip, color adjustment, contrast adjustment and switching between two dimensional (2D) display and three dimensional (3D) display) are provided. The user can operate the display of the display apparatus by suitably selecting any of the GUI parts.

It is to be noted that the operation screen image to be displayed on the centralized operation panel 5111 is not limited to the depicted example, and the user may be able to perform operation inputting to each apparatus which can be controlled by the audiovisual controller 5107 and the surgery room controlling apparatus 5109 provided in the surgery room system 5100 through the centralized operation panel 5111.

Figure 25:
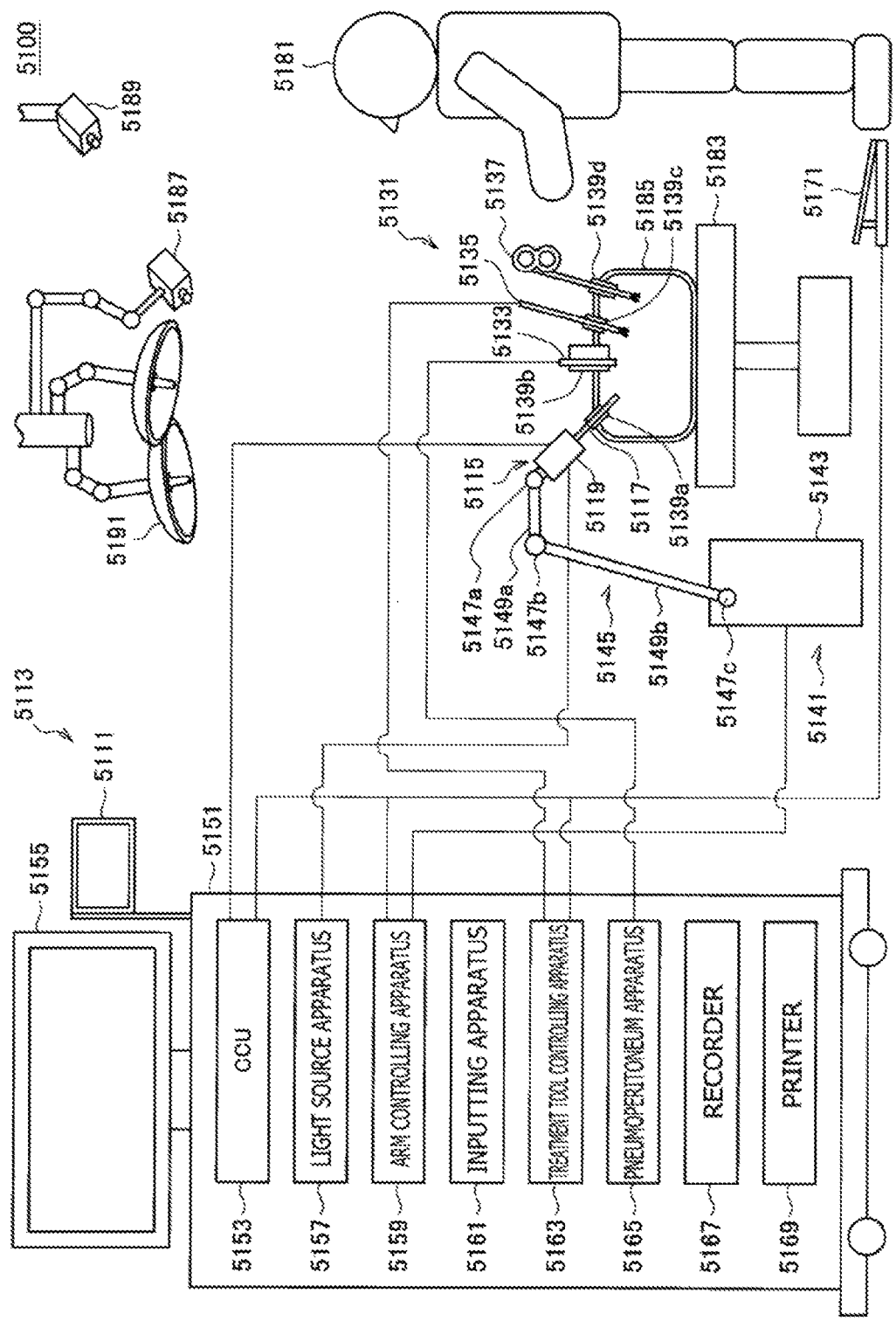
FIG. 25 is a view illustrating an example of a state of surgery to which the surgery room system is applied.

FIG. 25 is a view illustrating an example of a state of surgery to which the surgery room system described above is applied. The ceiling camera 5187 and the surgery field camera 5189 are provided on the ceiling of the surgery room such that it can image the hands of a surgeon (medical doctor) 5181 who performs treatment for an affected area of a patient 5185 on the patient bed 5183 and the entire surgery room. The ceiling camera 5187 and the surgery field camera 5189 may include a magnification adjustment function, a focal distance adjustment function, an imaging direction adjustment function and so forth. The illumination 5191 is provided on the ceiling of the surgery room and irradiates at least upon the hands of the surgeon 5181. The illumination 5191 may be configured such that the irradiation light amount, the wavelength (color) of the irradiation light, the irradiation direction of the light and so forth can be adjusted suitably.

The endoscopic surgery system 5113, the patient bed 5183, the ceiling camera 5187, the surgery field camera 5189 and the illumination 5191 are connected for cooperation with each other through the audiovisual controller 5107 and the surgery room controlling apparatus 5109 (not depicted in FIG. 25) as depicted in FIG. 23. The centralized operation panel 5111 is provided in the surgery room, and the user can suitably operate the apparatus existing in the surgery room through the centralized operation panel 5111 as described hereinabove.

In the following, a configuration of the endoscopic surgery system 5113 is described in detail. As depicted, the endoscopic surgery system 5113 includes an endoscope 5115, other surgical tools 5131, a supporting arm apparatus 5141 which supports the endoscope 5115 thereon, and a cart 5151 on which various apparatus for endoscopic surgery are mounted.

In endoscopic surgery, in place of incision of the abdominal wall to perform laparotomy, a plurality of tubular aperture devices called trocars 5139a to 5139d are used to puncture the abdominal wall. Then, a lens barrel 5117 of the endoscope 5115 and the other surgical tools 5131 are inserted into body lumens of the patient 5185 through the trocars 5139a to 5139d. In the example depicted, as the other surgical tools 5131, a pneumoperitoneum tube 5133, an energy treatment tool 5135 and forceps 5137 are inserted into body lumens of the patient 5185. Further, the energy treatment tool 5135 is a treatment tool for performing incision and peeling of a tissue, sealing of a blood vessel or the like by high frequency current or ultrasonic vibration. However, the surgical tools 5131 depicted are mere examples at all, and as the surgical tools 5131, various surgical tools which are generally used in endoscopic surgery such as, for example, a pair of tweezers or a retractor may be used.

An image of a surgical region in a body lumen of the patient 5185 picked up by the endoscope 5115 is displayed on a display apparatus 5155. The surgeon 5181 would use the energy treatment tool 5135 or the forceps 5137 while watching the image of the surgical region displayed on the display apparatus 5155 on the real time basis to perform such treatment as, for example, resection of an affected area. It is to be noted that, though not depicted, the pneumoperitoneum tube 5133, the energy treatment tool 5135, and the forceps 5137 are supported by the surgeon 5181, an assistant or the like during surgery.

(Supporting Arm Apparatus)

The supporting arm apparatus 5141 includes an arm unit 5145 extending from a base unit 5143. In the example depicted, the arm unit 5145 includes joint portions 5147a, 5147b and 5147c and links 5149a and 5149b and is driven under the control of an arm controlling apparatus 5159. The endoscope 5115 is supported by the arm unit 5145 such that the position and the posture of the endoscope 5115 are controlled. Consequently, stable fixation in position of the endoscope 5115 can be implemented.

(Endoscope)

The endoscope 5115 includes the lens barrel 5117 which has a region of a predetermined length from a distal end thereof to be inserted into a body lumen of the patient 5185, and a camera head 5119 connected to a proximal end of the lens barrel 5117. In the example depicted, the endoscope 5115 is depicted which is configured as a hard mirror having the lens barrel 5117 of the hard type. However, the endoscope 5115 may otherwise be configured as a soft mirror having the lens barrel 5117 of the soft type.

The lens barrel 5117 has, at a distal end thereof, an opening in which an objective lens is fitted. A light source apparatus 5157 is connected to the endoscope 5115 such that light generated by the light source apparatus 5157 is introduced to a distal end of the lens barrel 5117 by a light guide extending in the inside of the lens barrel 5117 and is applied toward an observation target in a body lumen of the patient 5185 through the objective lens. It is to be noted that the endoscope 5115 may be a direct view mirror or may be a perspective view mirror or a side view mirror.

An optical system and an image pickup element are provided in the inside of the camera head 5119 such that reflected light (observation light) from an observation target is condensed on the image pickup element by the optical system. The observation light is photoelectrically converted by the image pickup element to generate an electric signal corresponding to the observation light, namely, an image signal corresponding to an observation image. The image signal is transmitted as RAW data to a CCU 5153. It is to be noted that the camera head 5119 has a function incorporated therein for suitably driving the optical system of the camera head 5119 to adjust the magnification and the focal distance.

It is to be noted that, in order to establish compatibility with, for example, a stereoscopic vision (3D display), a plurality of image pickup elements may be provided on the camera head 5119. In this case, a plurality of relay optical systems are provided in the inside of the lens barrel 5117 in order to guide observation light to the plurality of respective image pickup elements.

(Various Apparatus Incorporated in Cart)

The CCU 5153 includes a central processing unit (CPU), a graphics processing unit (GPU) or the like and integrally controls operation of the endoscope 5115 and the display apparatus 5155. Specifically, the CCU 5153 performs, for an image signal received from the camera head 5119, various image processes for displaying an image based on the image signal such as, for example, a development process (demosaic process). The CCU 5153 provides the image signal for which the image processes have been performed to the display apparatus 5155. Further, the audiovisual controller 5107 depicted in FIG. 23 is connected to the CCU 5153. The CCU 5153 provides the image signal for which the image processes have been performed also to the audiovisual controller 5107. Further, the CCU 5153 transmits a control signal to the camera head 5119 to control driving of the camera head 5119. The control signal may include information relating to an image pickup condition such as a magnification or a focal distance. The information relating to an image pickup condition may be inputted through the inputting apparatus 5161 or may be inputted through the centralized operation panel 5111 described hereinabove.

The display apparatus 5155 displays an image based on an image signal for which the image processes have been performed by the CCU 5153 under the control of the CCU 5153. If the endoscope 5115 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5155. Where the apparatus is ready for imaging of a high resolution such as 4K or 8K, if the display apparatus used as the display apparatus 5155 has a size of equal to or not less than 55 inches, then a more immersive experience can be obtained. Further, a plurality of display apparatus 5155 having different resolutions and/or different sizes may be provided in accordance with purposes.

The light source apparatus 5157 includes a light source such as, for example, a light emitting diode (LED) and supplies irradiation light for imaging of a surgical region to the endoscope 5115.

The arm controlling apparatus 5159 includes a processor such as, for example, a CPU and operates in accordance with a predetermined program to control driving of the arm unit 5145 of the supporting arm apparatus 5141 in accordance with a predetermined controlling method.

An inputting apparatus 5161 is an input interface for the endoscopic surgery system 5113. A user can perform inputting of various kinds of information or instruction inputting to the endoscopic surgery system 5113 through the inputting apparatus 5161. For example, the user would input various kinds of information relating to surgery such as physical information of a patient, information regarding a surgical procedure of the surgery and so forth through the inputting apparatus 5161. Further, the user would input, for example, an instruction to drive the arm unit 5145, an instruction to change an image pickup condition (type of irradiation light, magnification, focal distance or the like) by the endoscope 5115, an instruction to drive the energy treatment tool 5135 or a like through the inputting apparatus 5161.

The type of the inputting apparatus 5161 is not limited and may be that of any one of various known inputting apparatus. As the inputting apparatus 5161, for example, a mouse, a keyboard, a touch panel, a switch, a foot switch 5171 and/or a lever or the like may be applied. Where a touch panel is used as the inputting apparatus 5161, it may be provided on the display face of the display apparatus 5155.

The inputting apparatus 5161 is otherwise a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5161 includes a camera which can detect a motion of a user, and various kinds of inputting are performed in response to a gesture or a line of sight of a user detected from a video picked up by the camera. Further, the inputting apparatus 5161 includes a microphone which can collect the voice of a user, and various kinds of inputting are performed by voice through the microphone. By configuring the inputting apparatus 5161 such that various kinds of information can be inputted in a contactless fashion in this manner, especially a user who belongs to a clean area (for example, the surgeon 5181) can operate an apparatus belonging to an unclean area in a contactless fashion. Further, since the user can operate an apparatus without releasing a possessed surgical tool from its hand, the convenience to the user is improved.

A treatment tool controlling apparatus 5163 controls driving of the energy treatment tool 5135 for cautery or incision of a tissue, sealing of a blood vessel or the like. A pneumoperitoneum apparatus 5165 feeds gas into a body lumen of the patient 5185 through the pneumoperitoneum tube 5133 to inflate the body lumen in order to secure the field of view of the endoscope 5115 and secure the working space for the surgeon. A recorder 5167 is an apparatus capable of recording various kinds of information relating to surgery. A printer 5169 is an apparatus capable of printing various kinds of information relating to surgery in various forms such as a text, an image or a graph.

In the following, especially a characteristic configuration of the endoscopic surgery system 5113 is described in more detail.

(Supporting Arm Apparatus)

The supporting arm apparatus 5141 includes the base unit 5143 serving as a base, and the arm unit 5145 extending from the base unit 5143. In the example depicted, the arm unit 5145 includes the plurality of joint portions 5147a, 5147b and 5147c and the plurality of links 5149a and 5149b connected to each other by the joint portion 5147b. In FIG. 25, for simplified illustration, the configuration of the arm unit 5145 is depicted in a simplified form. Actually, the shape, number and arrangement of the joint portions 5147a to 5147c and the links 5149a and 5149b and the direction and so forth of axes of rotation of the joint portions 5147a to 5147c can be set suitably such that the arm unit 5145 has a desired degree of freedom. For example, the arm unit 5145 may preferably be included such that it has a degree of freedom equal to or not less than 6 degrees of freedom. This makes it possible to move the endoscope 5115 freely within the movable range of the arm unit 5145. Consequently, it becomes possible to insert the lens barrel 5117 of the endoscope 5115 from a desired direction into a body lumen of the patient 5185.

An actuator is provided in the joint portions 5147a to 5147c, and the joint portions 5147a to 5147c include such that they are rotatable around predetermined axes of rotation thereof by driving of the actuator. The driving of the actuator is controlled by the arm controlling apparatus 5159 to control the rotational angle of each of the joint portions 5147a to 5147c thereby to control driving of the arm unit 5145. Consequently, control of the position and the posture of the endoscope 5115 can be implemented. Thereupon, the arm controlling apparatus 5159 can control driving of the arm unit 5145 by various known controlling methods such as force control or position control.

For example, if the surgeon 5181 suitably performs operation inputting through the inputting apparatus 5161 (including the foot switch 5171), then driving of the arm unit 5145 may be controlled suitably by the arm controlling apparatus 5159 in response to the operation input to control the position and the posture of the endoscope 5115. After the endoscope 5115 at the distal end of the arm unit 5145 is moved from an arbitrary position to a different arbitrary position by the control just described, the endoscope 5115 can be supported fixedly at the position after the movement. It is to be noted that the arm unit 5145 may be operated in a master-slave fashion. In this case, the arm unit 5145 may be remotely controlled by the user through the inputting apparatus 5161 which is placed at a place remote from the surgery room.

Further, where force control is applied, the arm controlling apparatus 5159 may perform power-assisted control to drive the actuators of the joint portions 5147a to 5147c such that the arm unit 5145 may receive external force by the user and move smoothly following the external force. This makes it possible to move the arm unit 5145 with comparatively weak force when the user directly touches with and moves the arm unit 5145. Accordingly, it becomes possible for the user to move the endoscope 5115 more intuitively by a simpler and easier operation, and the convenience to the user can be improved.

Here, generally in endoscopic surgery, the endoscope 5115 is supported by a medical doctor called scopist. In contrast, where the supporting arm apparatus 5141 is used, the position of the endoscope 5115 can be fixed with a higher degree of certainty without hands, and therefore, an image of a surgical region can be obtained stably and surgery can be performed smoothly.

It is to be noted that the arm controlling apparatus 5159 may not necessarily be provided on the cart 5151. Further, the arm controlling apparatus 5159 may not necessarily be a single apparatus. For example, the arm controlling apparatus 5159 may be provided in each of the joint portions 5147a to 5147c of the arm unit 5145 of the supporting arm apparatus 5141 such that the plurality of arm controlling apparatus 5159 cooperate with each other to implement driving control of the arm unit 5145.

(Light Source Apparatus)

The light source apparatus 5157 supplies irradiation light upon imaging of a surgical region to the endoscope 5115. The light source apparatus 5157 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5157. Further, in this case, if laser beams from the RGB laser light sources are applied time-divisionally on an observation target and driving of the image pickup elements of the camera head 5119 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5157 may be controlled such that the intensity of light to be outputted is changed for each predetermined time. By controlling driving of the image pickup element of the camera head 5119 in synchronism with the timing of the change of the intensity of light to acquire images time-divisionally and synthesizing the images, an image of a high dynamic range free from underexposed blocked up shadows and overexposed highlights can be created.

Further, the light source apparatus 5157 may be configured to supply light of a predetermined wavelength band ready for special light observation. In special light observation, for example, by utilizing the wavelength dependency of absorption of light of a body tissue, narrow band light observation (narrow band imaging) of imaging a predetermined tissue such as a blood vessel of a superficial portion of the mucous membrane or the like in a high contrast is performed by applying light of a narrower band in comparison with irradiation light upon ordinary observation (namely, white light). Alternatively, in special light observation, fluorescent observation for obtaining an image from fluorescent light generated by irradiation of excitation light may also be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5157 can be configured to supply such narrow-band light and/or excitation light suitable for special light observation as described above.

(Camera Head and CCU)

Figure 26:
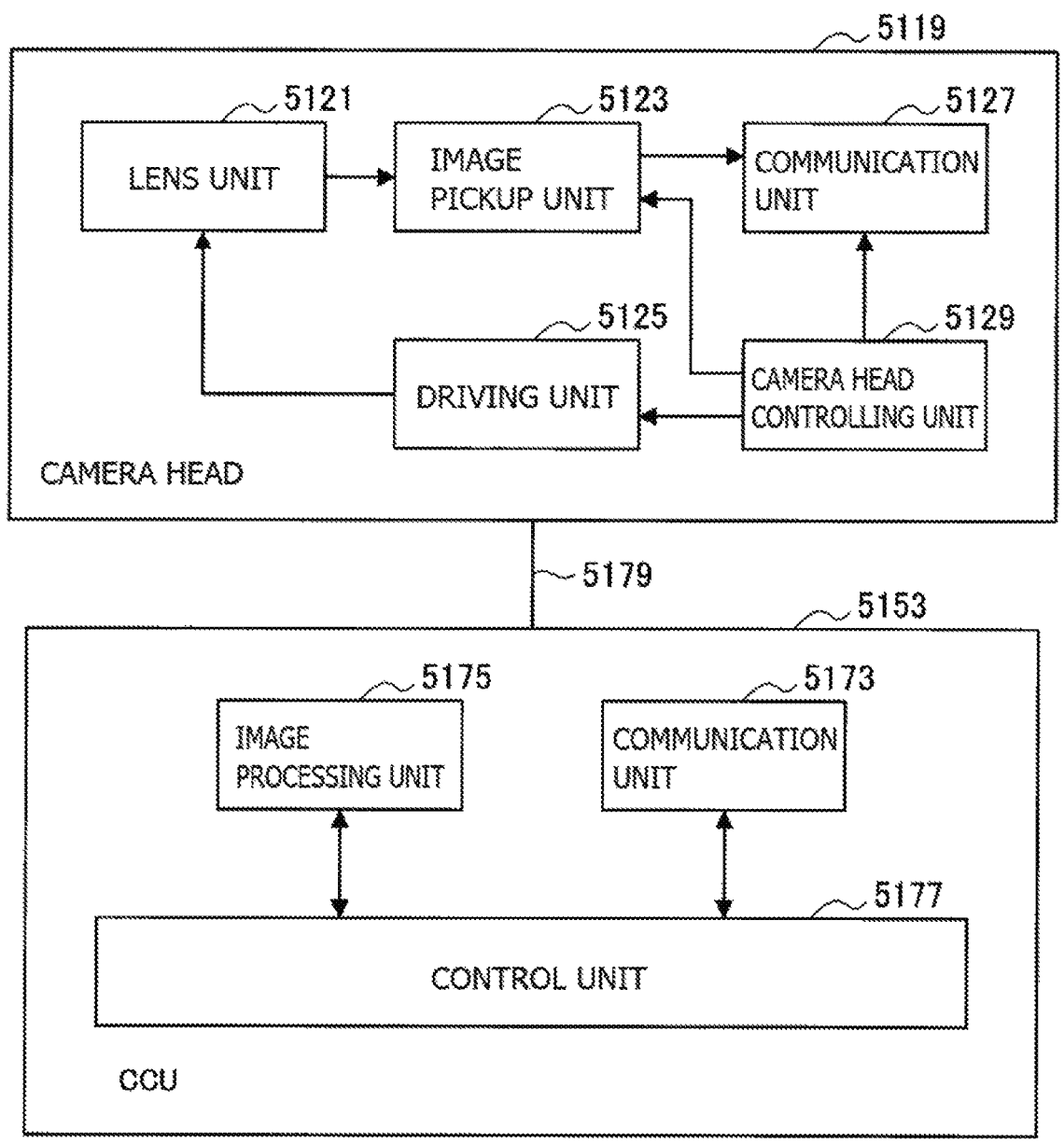
FIG. 26 is a block diagram depicting an example of a functional configuration of a camera head and a camera control unit (CCU) depicted in FIG. 25.

Functions of the camera head 5119 of the endoscope 5115 and the CCU 5153 are described in more detail with reference to FIG. 26. FIG. 26 is a block diagram depicting an example of a functional configuration of the camera head 5119 and the CCU 5153 depicted in FIG. 25.

Referring to FIG. 26, the camera head 5119 has, as functions thereof, a lens unit 5121, an image pickup unit 5123, a driving unit 5125, a communication unit 5127 and a camera head controlling unit 5129. Further, the CCU 5153 has, as functions thereof, a communication unit 5173, an image processing unit 5175 and a control unit 5177. The camera head 5119 and the CCU 5153 are connected to be bidirectionally communicable to each other by a transmission cable 5179.

First, a functional configuration of the camera head 5119 is described. The lens unit 5121 is an optical system provided at a connecting location of the camera head 5119 to the lens barrel 5117. Observation light taken in from a distal end of the lens barrel 5117 is introduced into the camera head 5119 and enters the lens unit 5121. The lens unit 5121 includes a combination of a plurality of lenses including a zoom lens and a focusing lens. The lens unit 5121 has optical properties adjusted such that the observation light is condensed on a light receiving face of the image pickup element of the image pickup unit 5123. Further, the zoom lens and the focusing lens include such that the positions thereof on their optical axis are movable for adjustment of the magnification and the focal point of a picked up image.

The image pickup unit 5123 includes an image pickup element and disposed at a succeeding stage to the lens unit 5121. Observation light having passed through the lens unit 5121 is condensed on the light receiving face of the image pickup element, and an image signal corresponding to the observation image is generated by photoelectric conversion. The image signal generated by the image pickup unit 5123 is provided to the communication unit 5127.

As the image pickup element which is included by the image pickup unit 5123, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5181 can comprehend a state of the surgical region in enhanced details and can proceed with the surgery more smoothly.

Further, the image pickup element which is included by the image pickup unit 5123 is configured such that it has a pair of image pickup elements for acquiring image signals for the right eye and the left eye compatible with 3D display. Where 3D display is applied, the surgeon 5181 can comprehend the depth of a living body tissue in the surgical region with a higher degree of accuracy. It is to be noted that, if the image pickup unit 5123 is configured as that of the multi-plate type, then a plurality of systems of lens units 5121 are provided corresponding to the individual image pickup elements of the image pickup unit 5123.

The image pickup unit 5123 may not necessarily be provided on the camera head 5119. For example, the image pickup unit 5123 may be provided just behind the objective lens in the inside of the lens barrel 5117.

The driving unit 5125 includes an actuator and moves the zoom lens and the focusing lens of the lens unit 5121 by a predetermined distance along the optical axis under the control of the camera head controlling unit 5129. Consequently, the magnification and the focal point of a picked up image by the image pickup unit 5123 can be adjusted suitably.

The communication unit 5127 includes a communication apparatus for transmitting and receiving various kinds of information to and from the CCU 5153. The communication unit 5127 transmits an image signal acquired from the image pickup unit 5123 as RAW data to the CCU 5153 through the transmission cable 5179. Thereupon, in order to display a picked up image of a surgical region in low latency, preferably the image signal is transmitted by optical communication. This is because, since, upon surgery, the surgeon 5181 performs surgery while observing the state of an affected area through a picked up image, in order to achieve surgery with a higher degree of safety and certainty, it is demanded for a moving image of the surgical region to be displayed on the real time basis as far as possible. Where optical communication is applied, a photoelectric conversion module for converting an electric signal into an optical signal is provided in the communication unit 5127. After the image signal is converted into an optical signal by the photoelectric conversion module, it is transmitted to the CCU 5153 through the transmission cable 5179.

Further, the communication unit 5127 receives a control signal for controlling driving of the camera head 5119 from the CCU 5153. The control signal includes information relating to image pickup conditions such as, for example, information that a frame rate of a picked up image is designated, information that an exposure value upon image picking up is designated and/or information that a magnification and a focal point of a picked up image are designated. The communication unit 5127 provides the received control signal to the camera head controlling unit 5129. It is to be noted that also the control signal from the CCU 5153 may be transmitted by optical communication. In this case, a photoelectric conversion module for converting an optical signal into an electric signal is provided in the communication unit 5127. After the control signal is converted into an electric signal by the photoelectric conversion module, it is provided to the camera head controlling unit 5129.

It is to be noted that the image pickup conditions such as the frame rate, exposure value, magnification or focal point are set automatically by the control unit 5177 of the CCU 5153 on the basis of an acquired image signal. In other words, an auto exposure (AE) function, an auto focus (AF) function and an auto white balance (AWB) function are incorporated in the endoscope 5115.

The camera head controlling unit 5129 controls driving of the camera head 5119 on the basis of a control signal from the CCU 5153 received through the communication unit 5127. For example, the camera head controlling unit 5129 controls driving of the image pickup element of the image pickup unit 5123 on the basis of information that a frame rate of a picked up image is designated and/or information that an exposure value upon image picking up is designated. Further, for example, the camera head controlling unit 5129 controls the driving unit 5125 to suitably move the zoom lens and the focus lens of the lens unit 5121 on the basis of information that a magnification and a focal point of a picked up image are designated. The camera head controlling unit 5129 may include a function for storing information for identifying of the lens barrel 5117 and/or the camera head 5119.

It is to be noted that, by disposing the components such as the lens unit 5121 and the image pickup unit 5123 in a sealed structure having high airtightness and high waterproof, the camera head 5119 can be provided with resistance to an autoclave sterilization process.

Now, a functional configuration of the CCU 5153 is described. The communication unit 5173 includes a communication apparatus for transmitting and receiving various kinds of information to and from the camera head 5119. The communication unit 5173 receives an image signal transmitted thereto from the camera head 5119 through the transmission cable 5179. Thereupon, the image signal may be transmitted preferably by optical communication as described above. In this case, for the compatibility with optical communication, the communication unit 5173 includes a photoelectric conversion module for converting an optical signal into an electric signal. The communication unit 5173 provides the image signal after conversion into an electric signal to the image processing unit 5175.

Further, the communication unit 5173 transmits, to the camera head 5119, a control signal for controlling driving of the camera head 5119. Also the control signal may be transmitted by optical communication.

The image processing unit 5175 performs various image processes for an image signal in the form of RAW data transmitted thereto from the camera head 5119. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5175 performs a detection process for an image signal for performing AE, AF and AWB.

The image processing unit 5175 includes a processor such as a CPU or a GPU, and when the processor operates in accordance with a predetermined program, the image processes and the detection process described above can be performed. It is to be noted that, where the image processing unit 5175 includes a plurality of GPUs, the image processing unit 5175 suitably divides information relating to an image signal such that image processes are performed in parallel by the plurality of GPUs.

The control unit 5177 performs various kinds of control relating to image picking up of a surgical region by the endoscope 5115 and display of the picked up image. For example, the control unit 5177 generates a control signal for controlling driving of the camera head 5119. Thereupon, if image pickup conditions are inputted by the user, then the control unit 5177 generates a control signal on the basis of the input by the user. Alternatively, where the endoscope 5115 has an AE function, an AF function and an AWB function incorporated therein, the control unit 5177 suitably calculates an optimum exposure value, focal distance and white balance in response to a result of a detection process by the image processing unit 5175 and generates a control signal.

Further, the control unit 5177 controls the display apparatus 5155 to display an image of a surgical region on the basis of an image signal for which the image processes have been performed by the image processing unit 5175. Thereupon, the control unit 5177 recognizes various objects in the surgical region image using various image recognition technologies. For example, the control unit 5177 can recognize a surgical tool such as forceps, a particular living body region, bleeding, mist when the energy treatment tool 5135 is used and so forth by detecting the shape, color and so forth of edges of the objects included in the surgical region image. The control unit 5177 causes, when it controls the display apparatus 5155 to display a surgical region image, various kinds of surgery supporting information to be displayed in an overlapping manner with an image of the surgical region using a result of the recognition. Where surgery supporting information is displayed in an overlapping manner and presented to the surgeon 5181, the surgeon 5181 can proceed with the surgery more safety and certainty.

The transmission cable 5179 which connects the camera head 5119 and the CCU 5153 to each other is an electric signal cable ready for communication of an electric signal, an optical fiber ready for optical communication or a composite cable thereof.

Here, while, in the example depicted in the figure, communication is performed by wired communication using the transmission cable 5179, the communication between the camera head 5119 and the CCU 5153 may be performed otherwise by wireless communication. Where the communication between the camera head 5119 and the CCU 5153 is performed by wireless communication, there is no necessity to lay the transmission cable 5179 in the surgery room. Therefore, such a situation that movement of medical staff in the surgery room is disturbed by the transmission cable 5179 can be eliminated.

An example of the surgery room system 5100 to which the technology according to an embodiment of the present disclosure can be applied has been described above. It is to be noted here that, although a case in which the medical system to which the surgery room system 5100 is applied is the endoscopic surgery system 5113 has been described as an example, the configuration of the surgery room system 5100 is not limited to that of the example described above. For example, the surgery room system 5100 may be applied to a soft endoscopic system for inspection or a microscopic surgery system in place of the endoscopic surgery system 5113.

The technology according to the present disclosure can be applied suitably to the camera head 5119 and the CCU 5153 among the components described above. In particular, the functions of the imaging apparatus 151 of FIG. 9 can be applied to the camera head 5119 and the CCU 5153. Since an accurate image offset amount can be detected by applying the technology according to the present disclosure to the camera head 5119 and the CCU 5153, focusing can be performed at a high speed. Consequently, a surgery image can be captured precisely at a higher speed.

It is to be noted that, in the present specification, the term "system" is used to represent an aggregation of a plurality of components (devices, modules (parts) and so forth) and it does not matter whether or not all components are accommodated in the same housing. Accordingly, not only a plurality of apparatus accommodated in separate housings and connected to each other through a network but also one apparatus where a plurality of modules is accommodated in a single housing are a system.

It is to be noted that the advantageous effects described in the present specification are exemplary to the last and are not restrictive, and other advantageous effects may be applicable.

The embodiment of the present technology is not limited to the embodiments described hereinabove, and various alterations can be made without departing from the subject matter of the present disclosure.

For example, the present technology can assume a configuration for cloud computing in which one function is shared and processed cooperatively by a plurality of devices through a network.

Further, the steps described hereinabove in connection with the flow charts can be executed by a single device or can be executed by sharing by a plurality of devices.

Furthermore, where one step includes a plurality of processes, the plurality of processes included in the one step can be executed by a single device and also can be executed by sharing by a plurality of devices.

[Example of Combination of Components]

The present technology can take such configurations as described below.

(1)
A focus detection device, including:
a calculation unit configured to perform calculation based on learning on the basis of a received light amount distribution of a first pixel group having a first property for phase difference detection and a received light amount distribution of a second pixel group having a second property different from the first property and output defocus amount related information relating to a defocus amount.

(2)
The focus detection device according to (1) above, in which
the calculation unit is a neural network created by mechanical learning.

(3)
The focus detection device according to (1) or (2) above, in which
the calculation unit outputs a blurring function of the first pixel group and a blurring function of the second pixel group as the defocus amount related information.

(4)
The focus detection device according to (1) or (2) above, in which
the calculation unit outputs an image offset amount that is a difference between a center-of-gravity position of a blurring function of the first pixel group and a center-of-gravity position of a blurring function of the second pixel group as the defocus amount related information.

(5)
The focus detection device according to any one of (1) to (4) above, in which
the calculation unit outputs reliability information representative of reliability of the defocus amount related information together with the defocus amount related information.

(6)
The focus detection device according to (5) above, in which
the calculation unit outputs class information that represents, in a numerical value, a class of the defocus amount to which a received light amount distribution of the first pixel group and a received light amount distribution of the second pixel group belong as the reliability information.

(7)
The focus detection device according to (5) above, in which
the calculation unit outputs accuracy information representative of accuracy calculated by comparison between the defocus amount related information outputted upon mechanical learning and correct information as the reliability information.

(8)
The focus detection device according to (5) above, in which
the calculation unit outputs similarity information indicative of closeness of a nature that a blurring function of the first pixel group and a blurring function of the second pixel group have a mirror image relation to each other as the reliability information.

(9)
The focus detection device according to (5) above, further including:
a decision unit configured to decide on the basis of the reliability information whether or not the defocus amount related information is to be used for focus detection.

(10)
The focus detection device according to any one of (1) to (9) above, further including:
a preprocessing unit configured to normalize received light amounts of pixels of the first pixel group and received light amounts of pixels of the second pixel group on the basis of received light amounts of the pixels of the first pixel group and received light amounts of the pixels of the second pixel group, in which
the calculation unit receives the normalized received light amounts of the pixels of the first pixel group and the normalized received light amounts of the pixels of the second pixel group as inputs thereto and outputs the defocus amount related information.

(11)

The focus detection device according to any one of (1) to (9) above, further including:

a preprocessing unit configured to normalize received light amounts of pixels of the first pixel group on the basis of a maximum received light amount among received light amounts of the pixels of the first pixel group and normalize received light amounts of pixels of the second pixel group on the basis of a maximum received light amount among received light amounts of the pixels of the second pixel group, in which the calculation unit receives the normalized received light amounts of the pixels of the first pixel group and the normalized received light amounts of the pixels of the second pixel group as inputs thereto and outputs the defocus amount related information.

(12)

The focus detection device according to any one of (1) to (9) above, further including:

a preprocessing unit configured to perform calculation of dividing values obtained by subtracting an average value from received light amounts of pixels of the first pixel group by a variance of the received light amounts of the first pixel group and dividing values obtained by subtracting an average value from received light amounts of pixels of the second pixel group by a variance of the received light amounts of the second pixel group, in which the calculation unit receives the received light amounts of the pixels of the first pixel group and the received light amounts of the pixels of the second pixel group obtained by the division individually by the variances as inputs thereto and outputs the defocus amount related information.

(13)

The focus detection device according to any one of (1) to (9) above, further including:

a preprocessing unit configured to add received light amounts of a predetermined number of pixels in the first pixel group and add received light amounts of a predetermined number of pixels in the second pixel group, in which the calculation unit receives the received light amount of the pixels of the first pixel group and the received light amount of the pixels of the second pixel group individually obtained by the addition of the received light amounts as inputs thereto and outputs the defocus amount related information.

(14)

The focus detection device according to any one of (1) to (9) above, further including:

a preprocessing unit configured to thin out pixels from the first pixel group and thin out pixels from the second pixel group, in which the calculation unit receives received light amounts of the pixels of the first pixel group and received light amounts of the pixels of the second pixel group after thinned out as inputs thereto and outputs the defocus amount related information.

(15)

A focus detection method by a focus detection device, including:

performing calculation based on learning on the basis of a received light amount distribution of a first pixel group having a first property for phase difference detection and a received light amount distribution of a second pixel group having a second property different from the first property and outputting defocus amount related information relating to a defocus amount.

(16)

A program for causing a computer to function as:

a calculation unit configured to perform calculation based on learning on the basis of a received light amount distribution of a first pixel group having a first property for phase difference detection and a received light amount distribution of a second pixel group having a second property different from the first property and output defocus amount related information relating to a defocus amount.

REFERENCE SIGNS LIST

101 Phase difference processing unit, 111 Mechanical learning processing unit, 121 Preprocessing unit, 122, 122-1, 122-2 Mechanical learning processing unit, 123 Reliability decision unit, 151 Imaging apparatus, 152 Network, 161 Lens, 162 Image pickup element, 163 Interpolation processing unit, 164 Signal processing unit, 165 Compression unit, 166 Storage unit, 167 Output controlling unit, 168 Display unit, 169 Focus detection unit, 170 Lens driving unit, 231 Learning apparatus, 331 Lens, 332 Camera, 351 Imaging target

The invention claimed is:

1. A focus detection device, comprising:

at least one processor configured to:

perform calculation based on learning on a basis of a received light amount distribution of a first pixel group having a first property for phase difference detection and a received light amount distribution of a second pixel group having a second property different from the first property;

output defocus amount related information relating to a defocus amount;

output reliability information representative of reliability of the defocus amount related information together with the defocus amount related information; and output class information that represents, in a numerical value, a class of the defocus amount to which the received light amount distribution of the first pixel group and the received light amount distribution of the second pixel group belong as the reliability information.

2. The focus detection device according to claim 1, wherein the at least one processor includes a neural network created by mechanical learning.

3. The focus detection device according to claim 2, wherein the at least one processor is further to output a blurring function of the first pixel group and a blurring function of the second pixel group as the defocus amount related information.

4. The focus detection device according to claim 2, wherein the at least one processor is further configured to output an image offset amount that is a difference between a center-of-gravity position of a blurring function of the first pixel group and a center-of-gravity position of a blurring function of the second pixel group as the defocus amount related information.

5. The focus detection device according to claim 2, wherein the at least one processor is further configured to normalize received light amounts of pixels of the first pixel group and received light amounts of pixels of the second pixel group, and the defocus amount related information is based on the normalized received light amounts of the pixels of the first pixel group and the normalized received light amounts of the pixels of the second pixel group.

6. The focus detection device according to claim 2, wherein
the at least one processor is further configured to:
normalize received light amounts of pixels of the first pixel group on a basis of a maximum received light amount among the received light amounts of the pixels of the first pixel group; and
normalize received light amounts of pixels of the second pixel group on a basis of a maximum received light amount among the received light amounts of the pixels of the second pixel group, and
the defocus amount related information is based on the normalized received light amounts of the pixels of the first pixel group and the normalized received light amounts of the pixels of the second pixel group.

7. The focus detection device according to claim 2, wherein
the at least one processor is further configured to perform calculation of:
dividing values obtained by subtracting an average value from received light amounts of pixels of the first pixel group by a variance of the received light amounts of the first pixel group to obtain a first value, and
dividing values obtained by subtracting an average value from received light amounts of pixels of the second pixel group by a variance of the received light amounts of the second pixel group to obtain a second value, and
the defocus amount related information is based on the first value and the second value.

8. The focus detection device according to claim 2, wherein
the at least one processor is further configured to:
add received light amounts of a specific number of pixels in the first pixel group to obtain a first light amount, and
add received light amounts of a specific number of pixels in the second pixel group to obtain a second light amount, and
the defocus amount related information is based on the first light amount and the second light amount.

9. The focus detection device according to claim 2, wherein
the at least one processor is further configured to thin out pixels from the first pixel group and thin out pixels from the second pixel group, and
the defocus amount related information is based on a pixel value of the thinned out first pixel group and a pixel value of the thinned out second pixel group.

10. The focus detection device according to claim 1, wherein
the at least one processor is further configured to output accuracy information representative of accuracy calculated by comparison between the defocus amount related information outputted upon mechanical learning and correct information as the reliability information.

11. The focus detection device according to claim 1, wherein
the at least one processor is further configured to output similarity information indicative of closeness of a nature that a blurring function of the first pixel group and a blurring function of the second pixel group have a mirror image relation to each other as the reliability information.

12. The focus detection device according to claim 1, wherein
the at least one processor is further configured to decide on a basis of the reliability information whether the defocus amount related information is to be used for focus detection.

13. A focus detection method by a focus detection device, comprising:
performing calculation based on learning on a basis of a received light amount distribution of a first pixel group having a first property for phase difference detection and a received light amount distribution of a second pixel group having a second property different from the first property;
outputting defocus amount related information relating to a defocus amount;
outputting reliability information representative of reliability of the defocus amount related information together with the defocus amount related information; and
outputting class information that represents, in a numerical value, a class of the defocus amount to which the received light amount distribution of the first pixel group and the received light amount distribution of the second pixel group belong as the reliability information.

14. A non-transitory computer-readable medium having stored thereon, computer-executable instructions, which when executed by an information processing apparatus, cause the information processing apparatus to execute operations, the operations comprising:
performing calculation based on learning on a basis of a received light amount distribution of a first pixel group having a first property for phase difference detection and a received light amount distribution of a second pixel group having a second property different from the first property;
outputting defocus amount related information relating to a defocus amount;
outputting reliability information representative of reliability of the defocus amount related information together with the defocus amount related information; and
outputting class information that represents, in a numerical value, a class of the defocus amount to which the received light amount distribution of the first pixel group and the received light amount distribution of the second pixel group belong as the reliability information.

15. A focus detection device, comprising:
at least one processor configured to:
perform calculation based on learning on a basis of a received light amount distribution of a first pixel group having a first property for phase difference detection and a received light amount distribution of a second pixel group having a second property different from the first property;
perform calculation of dividing values obtained by subtracting an average value from received light amounts of pixels of the first pixel group by a variance of the received light amounts of the first pixel group to obtain a first value and dividing values obtained by subtracting an average value from received light amounts of pixels of the second pixel group by a variance of the received light amounts of the second pixel group to obtain a second value; and output defocus amount related information relating to a defocus amount, based on the first value and the second value.

* * * * *